US012742882B2

(12) United States Patent
Abmann

(10) Patent No.: US 12,742,882 B2
(45) Date of Patent: Sep. 22, 2026

(54) SPARSE UNDER DISPLAY LIDAR

(71) Applicant: STMicroelectronics (Research & Development) Limited, Marlow (GB)

(72) Inventor: Andreas Abmann, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 1234 days.

(21) Appl. No.: 17/575,520

(22) Filed: Jan. 13, 2022

(65) Prior Publication Data

US 2023/0221436 A1 Jul. 13, 2023

(51) Int. Cl.
*G01S 17/10* (2020.01)
*G01S 7/51* (2006.01)
*G01S 17/894* (2020.01)
*G01S 17/931* (2020.01)

(52) U.S. Cl.
CPC ................ *G01S 17/10* (2013.01); *G01S 7/51* (2013.01); *G01S 17/894* (2020.01); *G01S 17/931* (2020.01)

(58) Field of Classification Search
CPC .......... G01S 17/10; G01S 7/51; G01S 17/894; G01S 17/931; G01S 7/4816
See application file for complete search history.

(56) References Cited

U.S. PATENT DOCUMENTS 10,043,050 B2 8/2018 Huang et al.
10,554,921 B1 * 2/2020 Lim ...................... G06V 40/18
10,585,194 B1 3/2020 Zhu et al.
10,802,066 B1 * 10/2020 Keaveney .............. G01R 29/10
11,740,723 B2 * 8/2023 Vampola ............. G09G 3/3406 345/102
12,481,029 B2 * 11/2025 Watson ................. G01S 7/4817
2006/0157640 A1 * 7/2006 Perlman ................. H04N 25/00 348/E5.079
2013/0088726 A1 * 4/2013 Goyal ..................... G01S 17/10 356/634
2017/0041598 A1 2/2017 Smithwick
2017/0177000 A1 6/2017 Meyhofer
2017/0255809 A1 9/2017 Huang et al.
2018/0012069 A1 * 1/2018 Chung ............... G06V 40/1394
(Continued)

FOREIGN PATENT DOCUMENTS

CN 108713201 A 10/2018
CN 109074474 A 12/2018
JP 2007251258 A 9/2007

OTHER PUBLICATIONS

Aβmann, A. et al., "Compressive Super-Pixel LiDAR for High-Framerate 3D Depth Imaging," 2019 IEEE GlobalSIP, 5 pages.
(Continued)

*Primary Examiner* — Isam A Alsomiri
*Assistant Examiner* — Joseph C Fritchman
(74) *Attorney, Agent, or Firm* — Slater Matsil, LLP

(57) ABSTRACT

A system to sample light including an array of light-sensitive pixels and a content display. The content display includes an array of content-display pixels; and an array of masking pixels individually selectable to switch between an opaque state and a transparent state, the array of masking pixels being aligned with the array of light-sensitive pixels so light-sensitive pixels may be selected to receive light passing through the content display by selecting the states of the array of masking pixels.

20 Claims, 20 Drawing Sheets

(56) References Cited

U.S. PATENT DOCUMENTS

| | | | | |
|---|---|---|---|---|
| 2018/0027201 | A1* | 1/2018 | Sankaranarayanan | H04N 23/955 348/308 |
| 2018/0188531 | A1 | 7/2018 | Dubey | |
| 2019/0037136 | A1* | 1/2019 | Downing | H04N 23/743 |
| 2019/0362120 | A1 | 11/2019 | Yeke Yazdandoost | |
| 2020/0150249 | A1* | 5/2020 | Leppin | G01S 7/4863 |
| 2021/0216163 | A1* | 7/2021 | Wang | G02F 1/294 |
| 2021/0385424 | A1 | 12/2021 | Assmann | |
| 2022/0018961 | A1* | 1/2022 | O'Keeffe | G01S 17/10 |
| 2024/0085776 | A1* | 3/2024 | Beaudry | G03F 1/54 |
| 2024/0305907 | A1* | 9/2024 | Uchida | G01S 7/487 |

OTHER PUBLICATIONS

Candes, E.J. et al., "An Introduction to Compressive Sampling," IEEE Signal Processing Magazine, 21, Mar. 2008, 10 pages.

Duarte, M.F. et al., "Single-Pixel Imaging via Compressive Sampling," IEEE Signal Processing Magazine, 83, Mar. 2008, 9 pages.

Hirsch, M. et al., "BiDi Screen: a Thin, Depth-Sensing LCD for 3D Interaction using Light Fields," ACM Transactions on Graphics, vol. 28, Issue 5, Dec. 1, 2009, 9 pages.

Izadi, S. et al., "Going Beyond the Display: A Surface Technology with an Electronically Switchable Diffuser," ACM Symposium on User Interface Software and Technology (UIST '08), Oct. 19-22, 2008, 10 pages.

Rhodes, T.J. et al., "A Transparent Display with Per-Pixel Color and Opacity Control," SIGGRAPH '19 Emerging Technologies, Jul. 28-Aug. 1, 2019, 3 pages.

Willett, R.M. et al., "Compressed Sensing for Practical Optical Imaging Systems: a Tutorial," SPIE, Optical Engineering 50(7), Jul. 2011, 14 pages.

* cited by examiner

SPARSE UNDER DISPLAY LIDAR

TECHNICAL FIELD

The present invention relates generally to a systems and methods for under display LIDAR.

BACKGROUND

Generally, Light Detection and Ranging "LIDAR" collect data from light projected into a three-dimensional environment. Depth information may be determined from the time of flight between light emission from a light source and detection at a sensor. However, it may be advantageous for multi-functional devices to display content and collect LIDAR data. But, spatial limitations can make it difficult to find location for both systems. An under-display LIDAR system may relieve spatial constraints and open the door to other advantages. And, LIDAR ranging emissions may be augmented by light produced by a content display.

SUMMARY

In accordance with an embodiment a system to sample light includes an array of light-sensitive pixels; and a content display including: an array of content-display pixels; and an array of masking pixels individually selectable to switch between an opaque state and a transparent state, the array of masking pixels being aligned with the array of light-sensitive pixels so light-sensitive pixels may be selected to receive light passing through the content display by selecting the states of the array of masking pixels.

In accordance with an embodiment the system further includes, wherein the array of content-display pixels comprises a transparent Organic Light Emitting Diode Array.

In accordance with an embodiment the system further includes a light source aligned with the array of masking pixels so light may be projected through the content display from the light source in illumination patterns that are determined by selecting the states of the array of masking pixels.

In accordance with an embodiment the system further includes, wherein the array of light-sensitive pixels is aligned with the array of masking pixels to receive light passing through the content display from a three-dimensional environment and the light source is aligned with the array of masking pixels to project light through the content display into the three-dimensional environment.

In accordance with an embodiment the system further includes a non-transitory computer readable memory and a processor in communication with the array of light-sensitive pixels, the non-transitory computer readable memory storing an instruction set that when executed causes the processor to derive a three-dimensional image from data collected from the array of light-sensitive pixels.

In accordance with an embodiment the system further includes, wherein data collected from the array of light-sensitive pixels includes data from light-sensitive pixels aligned with masking pixels in the opaque state.

In accordance with an embodiment the system further includes a controller that provides a drive signal to select the states of the array of masking pixels.

In accordance with an embodiment, the system further includes, wherein the controller includes a graphics processing unit.

In accordance with an embodiment a method to sense light includes having a content display and an array of pixels individually addressable to switch between an opaque state and a transparent state; and simultaneously displaying content on the content display and receiving light at an array of light-sensitive pixels through a pattern of masking pixels selected to be in the transparent state.

In accordance with an embodiment the method includes, wherein the pattern of masking pixels is sparse.

In accordance with an embodiment the method includes projecting a light pulse into a three-dimensional environment and collecting time of flight data from the array of light-sensitive pixels for light reflected from the three-dimensional environment through the content display.

In accordance with an embodiment the method includes deriving a three-dimensional image from the time of flight data.

In accordance with an embodiment the method includes, wherein deriving the three-dimensional image from the time of flight data includes utilizing compressed sensing.

In accordance with an embodiment, the method includes, wherein the time of flight data used to derive the three-dimensional image is augmented with data from the content display.

In accordance with an embodiment the method includes repeatedly varying the pattern of masking pixels selected to be in the transparent state to sample a three dimensional environment.

In accordance with an embodiment a system to sample light includes an array of light-sensitive pixels; a light source; a content display including: an array of content-display pixels; and an array of masking pixels individually selectable to switch between an opaque state and a transparent state, the array of masking pixels being aligned with the array of light-sensitive pixels so light-sensitive pixels may be selected to receive light passing through the content display by selecting the states of the array of masking pixels, and the array of masking pixels being aligned with the masking pixels so light may be may be projected through the content display from the light source in illumination patterns that are determined by selecting the states of the array of masking pixels; and a controller coupled with the array of masking pixels to provide a drive signal to select the states of the array of masking pixels.

In accordance with an embodiment the system includes a non-transitory computer readable memory and a processor in communication with the array of light-sensitive pixels, the non-transitory computer readable memory storing an instruction set that when executed causes the processor to derive a three-dimensional image from data collected from the array of light-sensitive pixels.

In accordance with an embodiment the system includes, wherein data collected from the array of light-sensitive pixels includes data from light-sensitive pixels aligned with masking pixels in the opaque state.

In accordance with an embodiment the system includes, wherein the array of content-display pixels comprises a transparent Organic Light Emitting Diode Array.

In accordance with an embodiment the system includes, wherein the controller includes a graphical processing unit.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. Unless otherwise noting elements referred to with the same numeric identifier in the figures may represent the same component.

Depth information may be collected from an environment by projecting light into the environment and timing the length of time needed for that light to reflect off objects in the environment and return to a detection sensor. Light-detecting sensors may be sensitive to light and are triggered when they encounter light. An array of sensors may count the number or triggers and this information may be used for determining depth information about the three-dimensional environment. A depth map, three-dimensional image, or two-dimensional picture may be determined from the sensing data collected.

Figure 1:
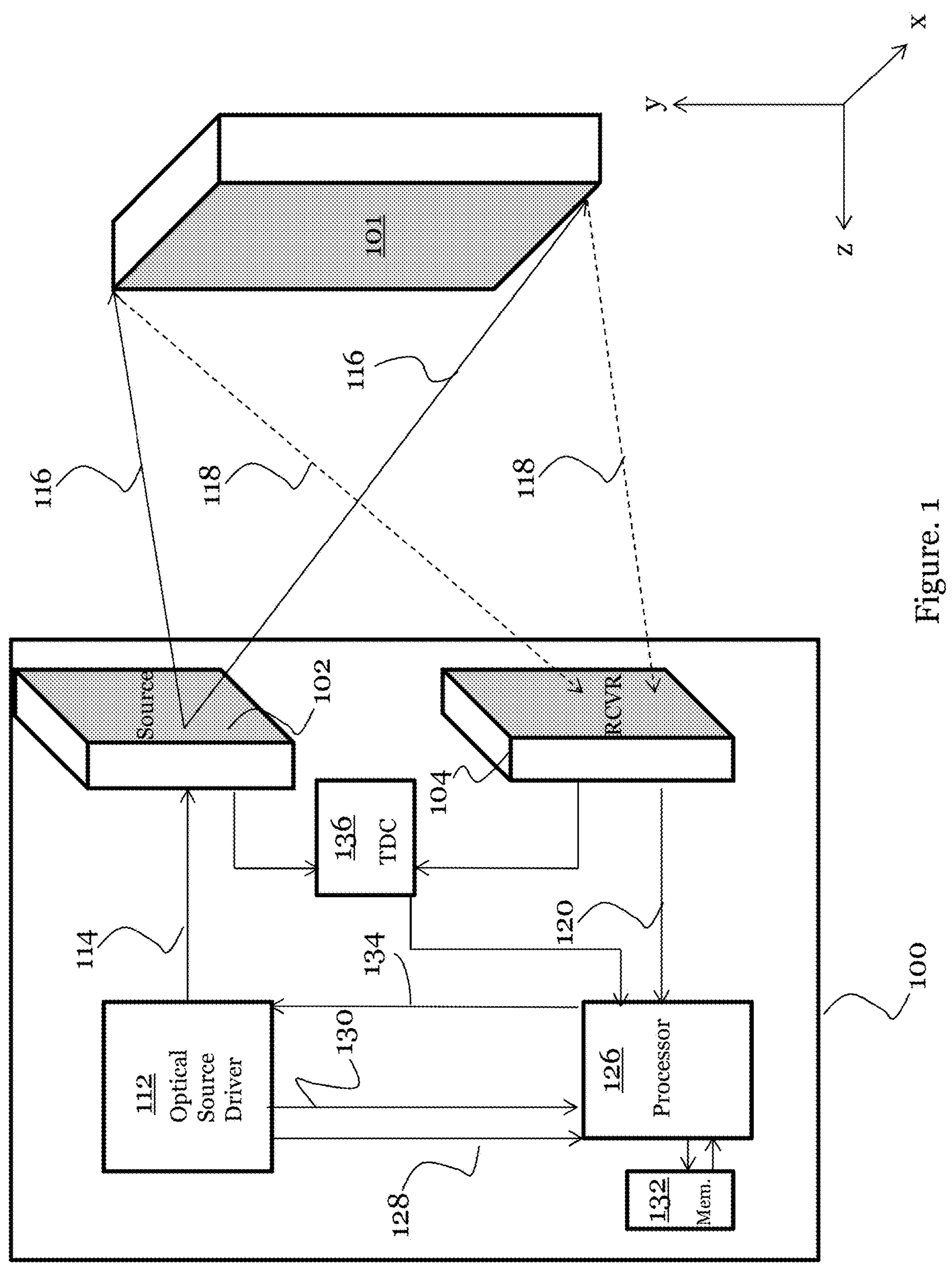
FIG. 1 illustrates a light-ranging system in accordance with an embodiment.

FIG. 1 illustrates a light-ranging system in accordance with an embodiment.

An object 101 is disposed in a three dimensional environment positioned in front of the light-ranging system 100. The light-ranging system 100 may be used to determine the proximity of the object 101 to the light-ranging system 100. The object 101 is provided for explanatory purposes. The three-dimensional environment may include additional objects of various shapes or sizes disposed at varying distances from the light-ranging system 100 and the light-ranging system 100 may determine the proximity of the various objects in the three-dimensional environment for imaging the three-dimensional environment. The object 101 may comprise multiple surfaces at various distances from the light-ranging system 100, and the light-ranging system 100 may determine the depth of the different surfaces of the object 101. The light-ranging system 100 may simultaneously determine the proximity of additional objects in the three dimensional environment to generate a three-dimensional image of the three-dimensional environment. The three-dimensional image may comprise a depth map of the three dimensional environment.

The light-ranging system 100 may comprise an optical source 102, which may be referred to as an optical transmitter, and an optical receiver 104.

Figure 2B:
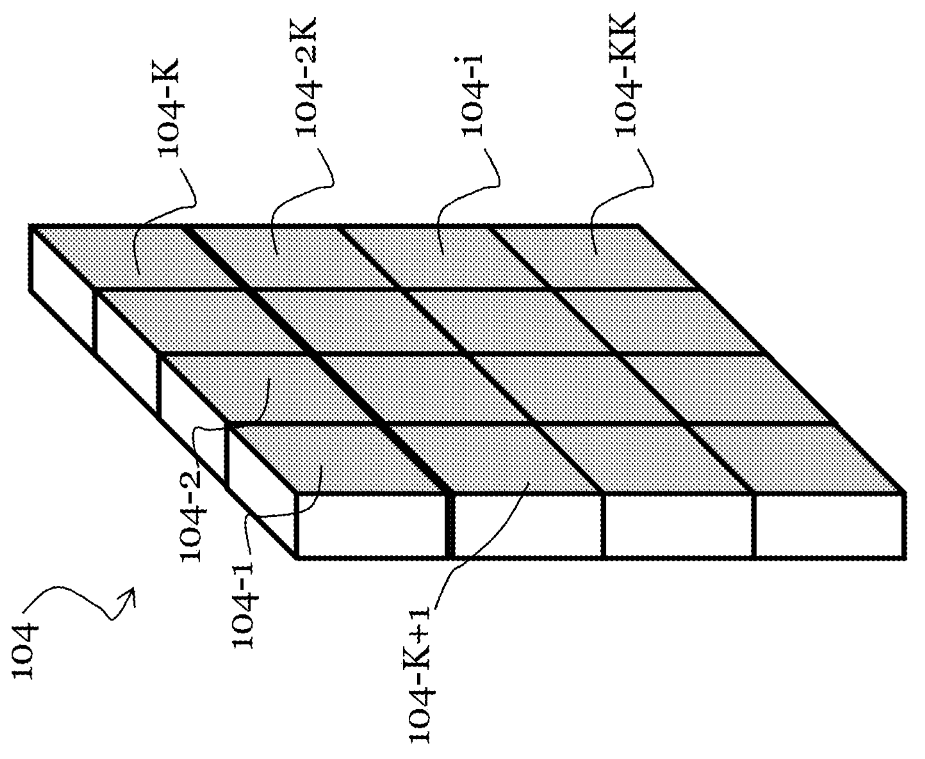
FIG. 2B shows an enlarged view of the optical receiver, in accordance with an embodiment.
Figure 2B:
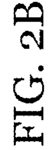
Figure 2A:
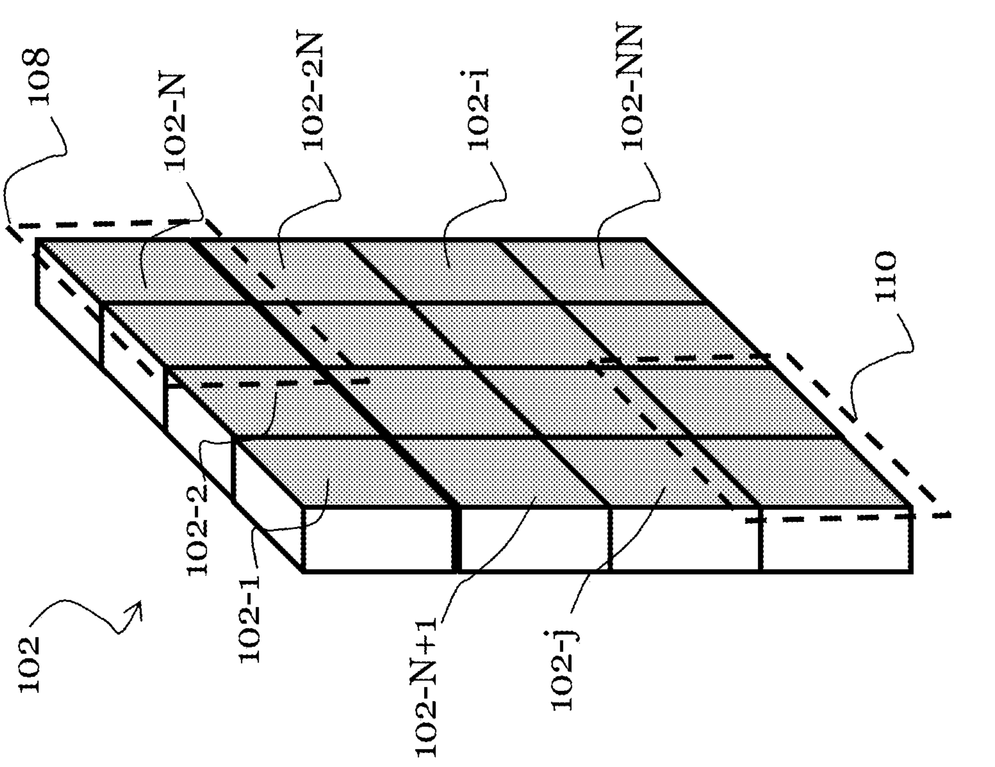
FIG. 2A shows an enlarged view of an optical source, in accordance with an embodiment.

FIG. 2A shows an enlarged view of an optical source 102, in accordance with an embodiment.

As depicted in FIG. 2A, the optical source 102 may comprise a plurality of pixels 102-1 to 102-NN arranged as an array. Although the example of FIG. 2A illustrates the optical source and plurality of pixels 102-1 to 102-NN as being arranged in a square N×N array, other array shapes (e.g. ellipsoidal arrays or circular-shaped arrays) may be possible in other embodiments. Each of the plurality of pixels 102-1 to 102-NN may comprise one or more infrared sources, modulated light emitting diodes (LEDs), or semiconductor lasers, or combinations thereof, although other types of optical sources may be possible. It should also be appreciated, that in various embodiments, the optical source may comprise a single point source rather than an array of pixels. In various embodiments, the optical source may comprise semiconductor lasers, vertical-cavity surface-emitting lasers (VCSELs), quantum well lasers, quantum cascade lasers, interband cascade lasers, or the like.

The plurality of pixels 102-1 to 102-NN may be configured to operate at the same wavelength. In other embodiments, however, the plurality of pixels 102-1 to 102-NN may operate at different wavelengths. For example, the group 108 of pixels and the group no of the plurality of pixels 102-1 to 102-NN may operate at different wavelengths. The plurality of pixels 102-1 to 102-NN may exhibit continuous wave (CW) operation, quasi-continuous wave (QCW) operation, or pulsed operation.

Referring back to FIG. 1, in various embodiments, the light-ranging system 100 may comprise an optical source driver 112. The operation of the optical source 102 may be controlled by the optical source driver 112. In various embodiments, the optical source driver may generate a drive current 114 that is capable of activating the optical source 102.

In various embodiments, the plurality of pixels 102-1 to 102-NN may be an addressable plurality of pixels 102-1 to 102-NN. The plurality of pixels 102-1 to 102-NN may be individually addressable where an optical emitter 102-*i* (shown in FIG. 2A) of the plurality of pixels 102-1 to 102-NN is addressable independently of another emitter 102-*j* of the plurality of pixels 102-1 to 102-NN. The drive current 114 provided by the optical source driver 112 to the optical source 102 may cause an optical emitter 102-*i* to be activated (and thereby emit a photon or photon pulse), while another emitter 102-*j* is not activated (and thereby does not emit a photon). In various embodiments, the plurality of pixels 102-1 to 102-NN may be addressable as a group or cluster, where one group 108 of the plurality of pixels 102-1 to 102-NN is addressable independently of another group no of the plurality of pixels 102-1 to 102-NN. In various embodiments, the drive current 114 provided by the optical source driver 112 to the optical source 102 may cause the group 108 of the plurality of pixels 102-1 to 102-NN to be activated (and thereby emit a photon or photon pulse), while another group no of the plurality of pixels 102-1 to 102-NN is not activated (and thereby does not emit a photon). Using an array of individually addressable pixels 102-1 to 102-NN allows dynamically reconfiguration of an illumination pattern of the optical source 102 and/or an intensity level of each of the plurality of pixels 102-1 to 102-NN of the plurality of pixels 102-1 to 102-NN to adapt to various applications or environments.

Radiation (light) emanating from the optical source 102, collectively shown in FIG. 1 as incident radiation 116 using solid arrows, may be incident upon the object 101. The incident radiation 116 is reflected off the object 101 to produce reflected radiation 118. It is noted that although incident radiation 116 and reflected radiation 118 are represented in FIG. 1 by few arrows, all radiation incident on and reflected from the object 101 may be combined in one beam or cone of radiation. While some part of the incident radiation 116 may be scattered depending upon the surface features of the object 101, a significant part of the incident radiation 116 may be reflected, thereby producing the reflected radiation 118.

The optical receiver 104 may receive the reflected radiation 118 and generates an output signal 120 in response to the reflected radiation 118 striking the optical receiver 104. The output signal 120 may be a digital signal or an analog signal, depending on the circuitry of the optical receiver 104.

FIG. 2B shows an enlarged view of the optical receiver 104, in accordance with an embodiment.

As depicted in FIG. 2B, the optical receiver 104 may comprise a plurality of light-sensitive pixels 104-1 to 104-KK. Although the example of FIG. 2B illustrates the light-sensitive pixels 104-1 to 104-KK as being arranged in a square K×K array, other array shapes (e.g. ellipsoidal arrays or circular-shaped arrays) may be possible in other embodiments. The intrinsic spatial resolution of the light-ranging system 100 may be determined by the resolution of the optical receiver 104. For example, since the light-sensitive pixels 104-1 to 104-KK in the embodiment of FIG. 2B are arranged as a K×K array, the intrinsic spatial resolution of the light-ranging system 100 may be a K×K image. It is noted that the output signal 120 may be expressed as a K×K matrix of measurements, or a $1\times K^2$ vector of measurements, with each entry of the matrix corresponding to the signal received from a respective pixel of the plurality of light-sensitive pixels 104-1 to 104-KK.

Figure 3:
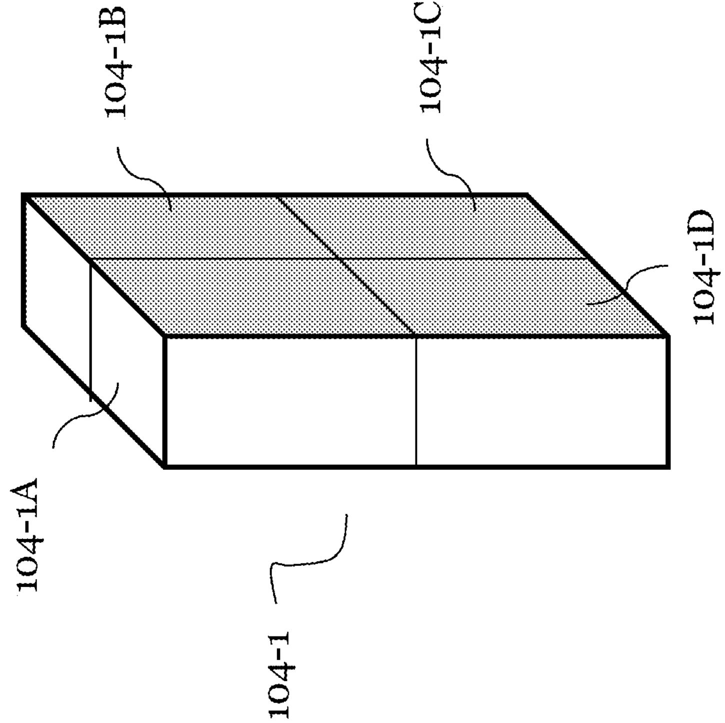
FIG. 3 depicts an embodiment of a light-sensitive pixel of the plurality of light-sensitive pixels.

FIG. 3 depicts an embodiment of a light-sensitive pixel 104-1 of the plurality of light-sensitive pixels 104-1 to 104KK.

In various embodiments, a light-sensitive pixel 104-1 may comprise a plurality of individual light-detecting sensors 104-1A to 104-1D. This may allow light-sensitive pixels to detect more reflected radiation and improve the signal to noise ratio of the output signal 120. The individual light-detecting sensors 104-1A to 104-1D may be combined by an OR tree so light-sensitive pixel 104-1 captures measurements from the plurality of individual light-detecting sensors 104-1A to 104-1D. The individual light-detecting sensors 104-1A to 104-1D may comprise single-photon avalanche diodes (SPADs) photo diodes (PDs), avalanche photo diodes (APDs), or combinations thereof. In embodiments comprising SPADs, the availability of more than one light-detecting sensor may allow photon detection while one or more of the individual SPADs are recharging. In various embodiments, some or all of the plurality of light-sensitive pixels 104-1 to 104-KK may comprise a plurality of individual light-detecting sensors. While detecting photons, the individual light-detecting sensors of a radiation-sensing pixel may be firing at random but correlated to the arrival of photons onto the radiation pixel.

Although, light-sensitive pixel 104-1 is depicted with four individual light-detecting sensors 104-1A to 104-D arranged in a 2×2 array, it will be appreciated that light-sensitive pixel 104-1 may comprise any number of individual light-detecting sensors. In various embodiments, the light-sensitive pixel 104-1 may comprise a 4×4 array of individual light-detecting sensors, an 8×8 array of individual light-detecting sensors, a 16×16 array of individual light-detecting sensors or any other number of individual light-detecting sensors. In various embodiments, each pixel may comprise singe light-sensitive sensor.

As shown in FIG. 1, the light-ranging system 100 further comprises a processor 126 configured to receive the output signal 120 and determine the proximity of the object 101 to the light-ranging system 100 based on the output signal 120. The processor 126 can additionally reconstruct three-dimensional images of the object 101 based on the output signal 120 as well as 2D intensity images related to reflective properties of surfaces in the scene.

The optical source driver 112 may be programmed to drive the plurality of pixels 102-1 to 102-NN to generate incident radiation pulses. The optical source driver 112 may receive a control signal 134 from the processor 126 that initiates the optical source driver 112. The control signal 134 may determine which of the plurality of pixels 102-1 to 102-NN are active and which are inactive. In embodiments where the optical source 102 comprises a single point source the drive current 114 may activate the optical source 102.

The radiation from the optical source 102 may illuminate the object 101 in a predetermined timing sequence or at predetermined timing intervals. The object 101 may reflect the incident radiation 116 and the arrival times of the pulses of reflected radiation 118 at the optical receiver 104 are proportional to twice the distance between the object 101 and the light-ranging system 100, based on the speed of light in the measurement medium or environment.

The optical source 102 may comprise semiconductor lasers (e.g. VCSELs), while the optical receiver 104 may comprise high speed photodetectors (e.g. SPADs). The optical receiver 104 may be configured to record at least one of arrival times, pulse shapes, or intensities of the pulses of reflected radiation 118. Reflected radiation 118 may arrive at different times at the optical receiver 104, depending on the respective distances between the different parts of the object 101 or other objects in the three-dimensional environment and the light-ranging system 100. The reflected radiation 118 may be detected synchronously with a timing signal 130 that is configured to cause the optical source driver 112 to generate incident radiation 116. The processor 126 may analyze the time-of-flight (ToF) between emission of incident radiation 116 travelling towards the object 101 and arrival of reflected radiation 118 received at the optical receiver 104 to determine the proximity of the object 101 of objects in the three-dimensional environment. A plurality of proximity measurements may be used to generate a comprehensive set of data to accurately determine both lateral spatial distances (e.g. in the x-y plane shown in FIG. 1) and depth (e.g. along the z-axis shown in FIG. 1) of the object or objects in the three-dimensional environment.

In various embodiments, photons counted at a light-sensitive pixel may be categorized based on ToF analysis to generate a histogram of estimated distances of the object or surface that reflected the radiation to the light-sensitive pixel. Conceptually, the ToF of a photon sensed at a light-sensitive pixel may be calculated and assigned to a bin that represents a distance. As additional photons are sensed during a measurement, they may be assigned to a bin. The various bins may accumulate a photon count and the distribution of photons in the various bins may be used to estimate the distance from the light-ranging system 100 of the reflective surface measured at the light-sensitive pixel. The photon-counting process may be a Poisson process.

In various embodiments, the light-ranging system 100 may comprise one or more time to digital converters. TDC 136 in communication with the optical source 102, the optical receiver 104, and the processor. The one or more TDCs 136 may measure the interval between the emission of incident radiation 116 from the optical source 102 and the arrival of reflected radiation 118 at the optical receiver 104 and provide it to the processor 126. In various embodiments, the processor 126 may comprise the TDC and the interval between emission and arrival may be calculated using a timing signal 130 to trigger the emission and the time of arrival.

In addition to determining the proximity of the object 101 to the light-ranging system 100 based on the output signal 120, the processor 126 can also generate three-dimensional images of the three dimensional environment including the object 101 and other objects that may be present in the three-dimensional environment based on the output signal 120 and a 2D image of intensity, here photon count, with respect to the reflectivity of the environment and object 101 and all other objects and their associated material properties and their effect on photon reflectivity.

Compressed sensing is one method of gaining spatial information about the three-dimensional environment using a known illumination source and limited sensing resolution. In other words, compressed sensing allows a three-dimensional image of an object 101 having L×L pixels even when the number of measurements or the number of pixels at the optical receiver 104 is less than $L^2$. This may be desirable to reduce the number of the plurality of pixels 102-1 to 102-NN of the light-ranging system, or the number of the plurality of pixels 102-1 to 102-NN used for any given measurement. This may be preferred to reduce the power consumption of the source or avoid introducing an undesirable or dangerous amount of light into the three-dimensional system. Compressed sensing may also reduce the bandwidth needed for receiving the measurements by reducing the number of light-sensitive pixels 104-1 to 104-KK needed to collect the measurements for generating a three-dimensional image Such a scenario produces an underdetermined linear equation system. However, in compressed sensing, the fact that most data can be described sparsely in some basis, other than the normal pixel basis, may be used to select a reconstruction basis that could produce the measurement results using the least number of non-zero basis coefficients (i.e., the sparsest description). The reconstruction basis may be the normal pixel basis or any basis that is suitable for describing the object 101 in a sparse way. For example, a scene comprising a few simple surfaces in a planar background may be describable by the normal pixel basis and total variation. On the other hand, a scene comprising several complex surfaces with different characteristics may be describable by a wavelet basis.

In an embodiment of a compressed sensing system that constructs an image of the three-dimensional environment, the object 101 is illuminated by a series of patterns of emitted light based on a pixel regime (illumination pattern). The reflected radiation 118 may be detected at the optical receiver 104 and stored, e.g., in a memory 132 comprised in the light-ranging system 100. Alternative patterns of emitted light may subsequently be projected according to other illumination patterns, in a sequential manner, into the three-dimensional environment and the radiation reflected from objects in the three-dimensional environment may be detected and stored in the memory 132. Assuming E separate patterns of emitted light (also referred to E separate exposures), where $E \ll K^2 < L^2$, the processor 126 reconstructs, by linear processing, an L×L image from the E separate intensity measurements even though $E \ll K^2 < L^2$.

In mathematical terms, a signal that, for example may represent a depth map of the three-dimensional environment, may be expressed as $x \in \mathbb{R}^n$. The signal, x may correspond to a depth map having $L^2$ pixels where each pixel may correspond to a depth of a surface in the three-dimensional environment measured from the location of a pixel. The depth map signal x may be acquired by canvasing the three-dimensional environment with $L^2$ optical source projections by simultaneously activating $L^2$ optical sources into the three-dimensional environment and measuring light reflected from the environment at $L^2$ light-detecting sensors to catalog every pixel of the signal.

By utilizing compressed sensing the number of optics-source projections may be reduced. Assuming the vector x is compressible, which is true of most natural signals $x \in \mathbb{R}^n$, x may be recovered according to the principles of compressed sensing by randomly sampling the three-dimensional environment to acquire a data vector smaller than x. For example, to produce a depth-map of a three-dimensional environment, data from the random sampling may be represented by y where entries in y may correspond to a depth measurement of the three-dimensional environment and communicated to a processor 126 by the output signal 120. In other words, $y \in \mathbb{R}^m$, where m<n. The vector x can be reconstructed with y according to the Equation 1.

$$y = Ax \qquad \text{Equation 1}$$

For Equation 1, $A \in \mathbb{R}^{m \times n}$ where $A = \theta\phi$. θ may represent a random illumination pattern of the optical sources of optical source 102. And, ϕ may be a linear transform. For a sparse signal $s = \phi x$, many of the components are approximately zero, with few significant non-zeros samples. The significant components may be sampled using a light-ranging system 100 by means of the random projection. θ. To reconstruct the natural signal, x, from this data a penalty function, g(.), is applied (often the l1 norm or total variation (TV) or other sparsity inducing transform function) to match the sparsity constraint of the signal in the reconstruction process. Reconstruction of the signal is often formulated as an optimization problem of the form of Equation 2. $A=\theta\phi$ may be referred to as a sensing matrix.

$$\min_x g(\theta x) \quad \text{s.t. } y = Ax \qquad \text{Equation 2}$$

Figure 4:
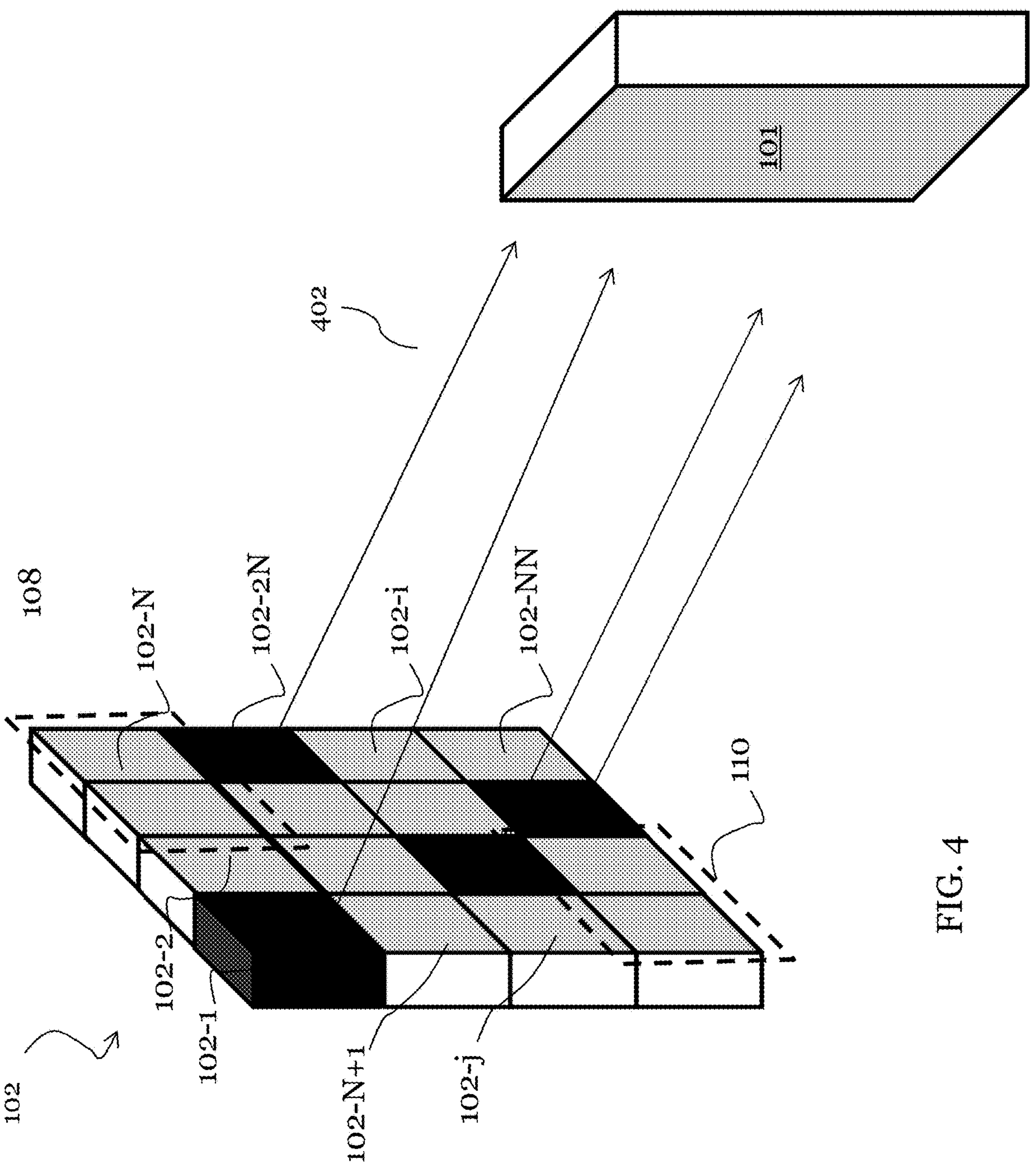
FIG. 4 depicts a random pattern of individual light sources that may be used to generate a pattern of emitted light.

FIG. 4 depicts a random pattern of individual light sources that may be used to generate a pattern of emitted light.

In FIG. 4, activated individual light sources of the plurality of pixels 102-1 through 102-NN are shaded black in an illumination pattern. The illumination pattern may correspond to the light sources selected to generate light activated light sources from FIG. 4 may project a pattern of emitted light 402 into the three-dimensional environment. The pattern of emitted light 402 may be determined by an illumination matrix corresponding to an illumination pattern. The illumination matrix may comprise an entry storing a binary value for each individual light pixel of the plurality of pixels 102-1 through 102-NN. Activated individual light pixels of the plurality of pixels 102-1 through 102-NN may be identified by a high value or a "1" and deactivated light sources may be identified by a low value or "0." For example, assume a 4×1 illumination matrix takes the following values: [1 0 0 1]. Light sources 102-11, and 102-22 of a 2×2 pixel array may be activated and 102-12 and 102-22 may be deactivated when the pattern of emitted light is generated. An illumination matrix may be used as θ in A in Equation 2.

The pattern of emitted light 402 may encounter objects in three-dimensional environment, for example 101, and reflect off the various surfaces towards an optical receiver 104. In various embodiments, a subset of the plurality of light-sensitive pixels 104-1 to 104-KK may be activated in a sensing pattern to receive light reflected from the three-dimensional environment.

Figure 5:
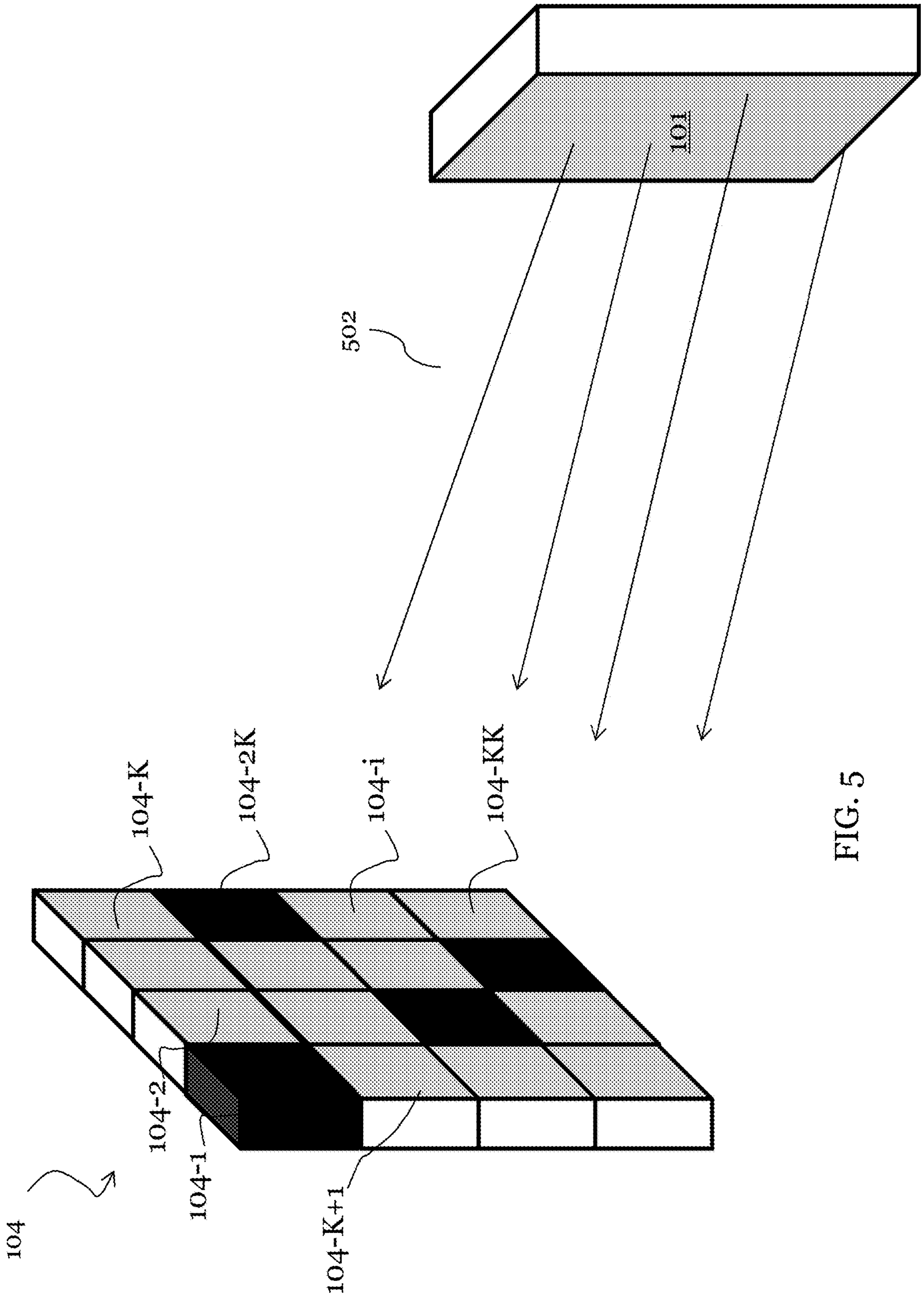
FIG. 5 depicts an optical receiver with light-sensing pixels stimulated in a sensing pattern.

FIG. 5 depicts an optical receiver 104 with an array of light-sensing pixels stimulated in a sensing pattern.

Radiation-sensing pixels of the plurality of light-sensitive pixels 104-1 to 104-KK that have been enabled are shaded black. The plurality of light-sensitive pixels 104-1 to 104-KK may be stimulated by a pattern of reflected light 502 originating from the pattern of emitted light 402 and reflected from one or more surfaces in the three-dimensional environment. A light-sensitive pixel may be stimulated when it receives a photon. Information from the stimulated radiation-sensing pixels may be included in the output signal 120 an allow photon counting for ToF or other measurements to be determined.

A sensing pattern may correspond to the pattern of emitted light 402 as determined by an illumination matrix. In various embodiments, one light-sensitive pixel of the plurality of light-sensitive pixels 104-1 to 104-KK may be enabled in the sensing pattern for each individual light source of the plurality of pixels 102-1 through 102-NN activated for the pattern of emitted light.

After, or while, the pattern of reflected light 502 is received, or is being received, by the optical receiver 104 the processor may collect data from light-sensitive pixels of the plurality of light-sensitive pixels 104-11 to 104KK that have been stimulated by the pattern of reflected light 502. The processor 126 may be in communication with the optical receiver 104 and process the data to generate a measurement matrix. The measurement matrix may be used for y in Equation 1. In various embodiments, the measurement matrix may be comprised of a plurality of measurement vectors. The measurement matrix may have more than one dimension, for example, if there are multiple detector arrays.

In various embodiments, the sampling process may be repeated one or more times to collect data to reconstruct a signal representing a three-dimensional image such as a depth chart. A first random pattern of emitted light may be projected from optical source 102. The pattern of emitted light may reflect off objects, for example, object 101, in the three dimensional environment, which may be received at the optical receiver 104 and detected by plurality of light-sensitive pixels 104-1. A second random pattern of emitted light may be then projected from optical source 102. The second pattern of emitted light may reflect off objects, for example, object 101, in the three dimensional environment, which may be received at the optical receiver 104 and detected by plurality of light-sensitive pixels 104-1-104-NN. The data detected at the optical receiver 104 during each iteration may be aggregated in a measurement vector used to generate a three-dimensional image such as a depth map. This process may be repeated with a different random illumination pattern for each iteration as many times as desired to collect data to generate the three-dimensional image such as a depth chart of the three-dimensional environment. A series of illumination patterns $A_1$ through $A_m$ may be used to determine the pattern of emitted light for a first repetition through an mth repetition, respectively.

In various embodiments, a series illumination patterns may be pre-computed. This may save processing time while the light-ranging system is operating. Pre-computed illumination patterns may be stored in memory 132. One illumination pattern may be retrieved and used to drive the optical source 102 to generate a pattern of emitted light. Additional illumination patterns may be retrieved for additional sampling iterations. The illumination patterns may generated by a pseudo-random process. The illumination pattern may provide instructions for the optical source driver 112 to activate to a subset of the plurality of pixels 102-1 through 102-NN to project the pattern of emitted light into the three-dimensional environment. In various embodiments, the processor 126 may also comprise a pattern generator to generate random illumination patterns. In various embodiments, the processor may comprise a non-transitory computer readable memory.

Light ranging systems are used a wide variety of growing applications. In many cases, light ranging may be utilized in devices that also comprise various forms of content displays. For example, a light ranging system may be used on smartphones, tablets, vehicles, interactive displays and many other varieties of devices. Ranging may be utilized for facial recognition, finger printing or imaging. In one example, self-driving cars may also use ranging to detect obstacles and hazards on a road. Self-driving cars may also comprise external displays on the body of the vehicle to communicate with pedestrians and others outside the car.

However, many devices are subject to spatial limitations that may make it difficult to include light ranging systems and displays. Ranging systems may thus be located in obtrusive locations that negatively impact the form of the device and expose the ranging system to potential damage. This issue, and others, may be addressed by locating a ranging system underneath a user-facing content display.

Figure 6:
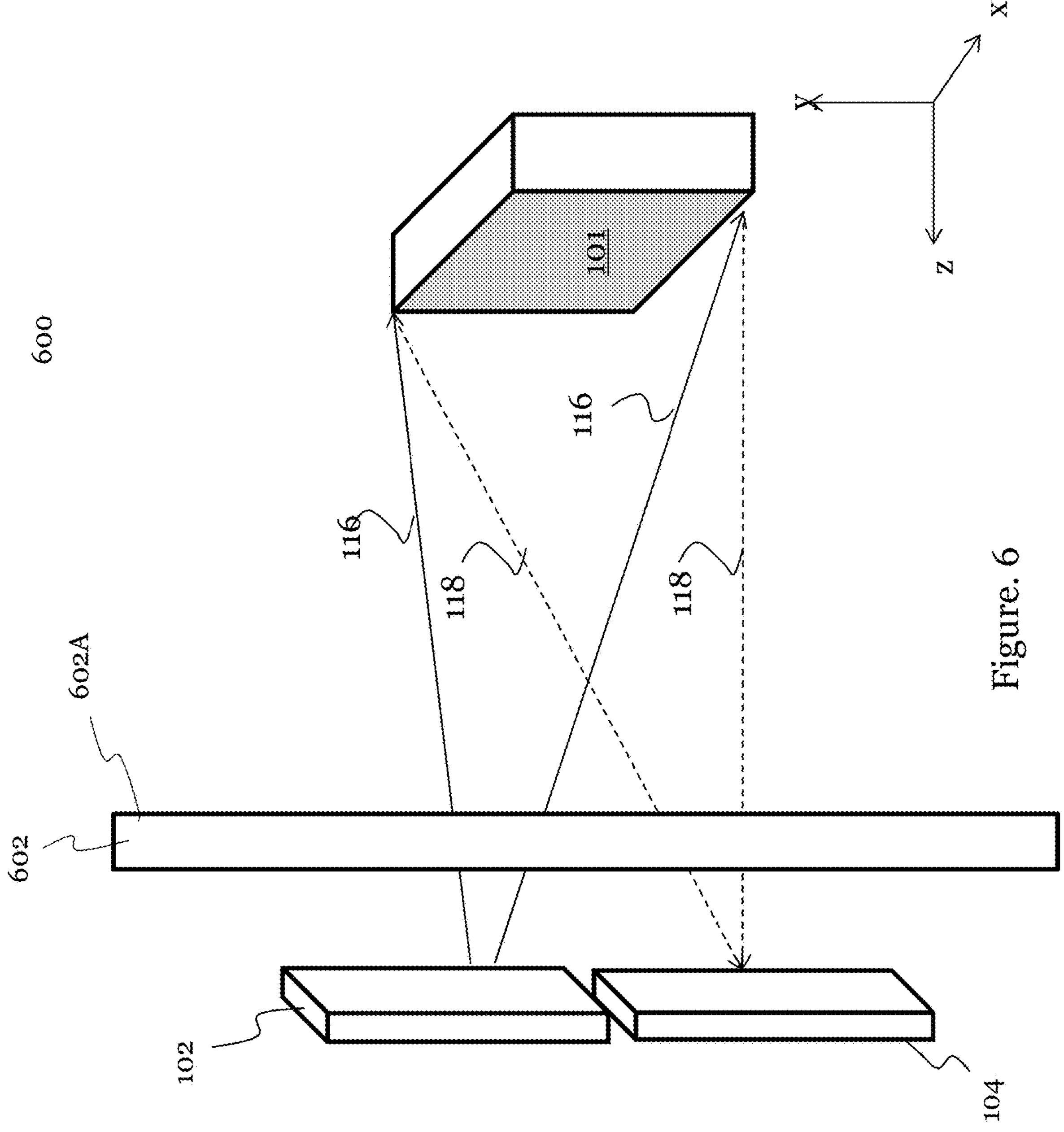
FIG. 6 depicts a light ranging system under a content display in accordance with an embodiment.

FIG. 6 depicts a light ranging system under a content display in accordance with an embodiment.

A light-sampling and content display system 600 may comprise a optical receiver 104 (which may comprise an array of light-sensitive pixels) and an optical source 102. The light-sampling and content display system 600 may further comprise a content display 602. The content display 602 may display content on a display surface 602A. For example, the content display may present an image or video on the display surface. The display surface 602A may be located on an opposite side of the content display as the optical source 102 and the optical receiver 104.

In various embodiments, the optical receiver may receive light passing through the content display from a three-dimensional environment. The optical source 102 may also project light into three-dimensional environment through the content display 602. For ranging, the optical source 102 may project light that passes through the content display 602 and into the three-dimensional environment, which may be reflected from object 101 and pass back through the content display 602 where it is sensed by the optical receiver 104, such as an array of light-sensitive pixels. In various embodiments, the optical receiver 104 may be located behind or under the content display 602. The optical source 102 may also be located behind or under the content display. In various embodiments, the light-sampling and content display system 600 may further comprise an optical source driver 112, processor 126, memory 132, and TDC 136 as discussed with reference to FIG. 1 to perform ranging (not shown in FIG. 6).

To allow light to pass through the display to reach the optical receiver 104 the content display 602 may comprise a transparency modulator. And, to display image content the content display may comprise a transparent spatial light modulator. This may provide a means open and close pathways to an array of light-sensitive pixels of an optical receiver 104, an optical source 102 or both to allow ranging while simultaneously displaying content on the content display surface.

Figure 7:
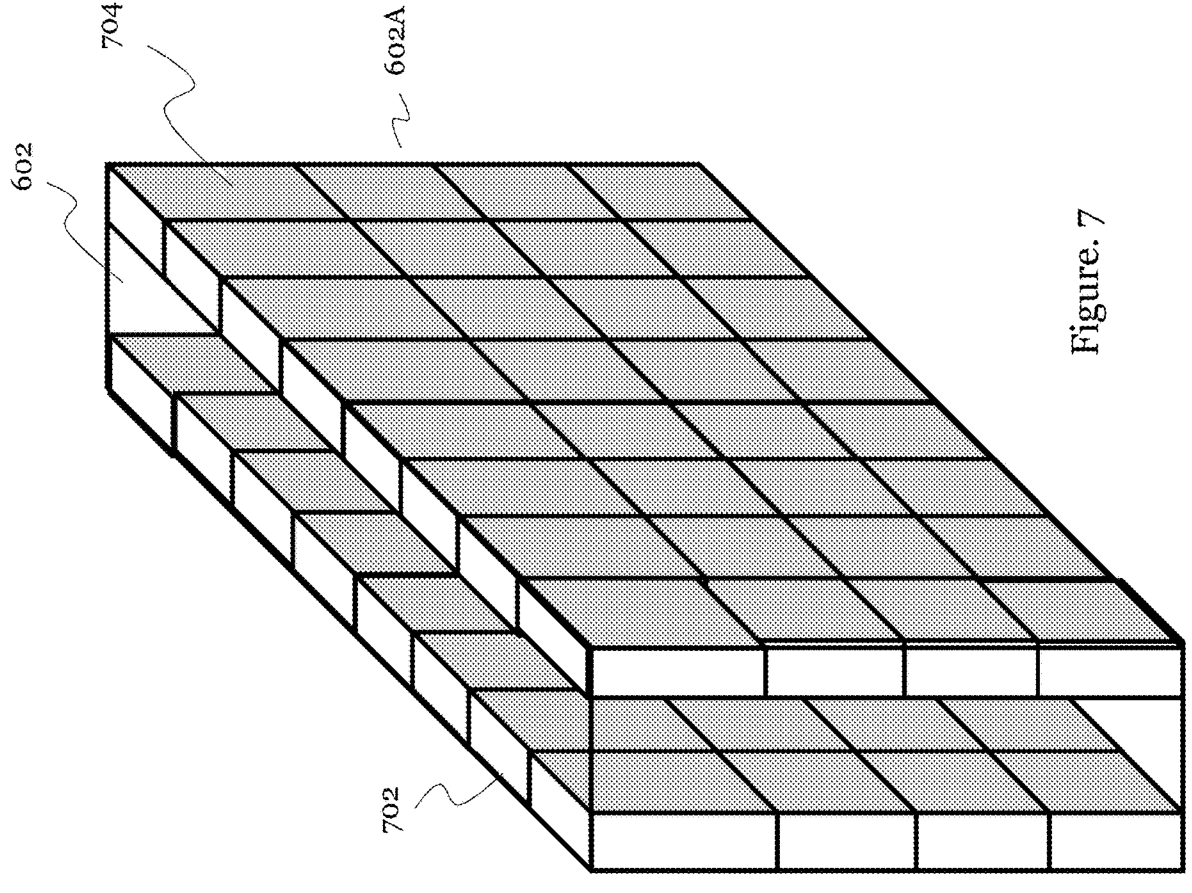
FIG. 7 depicts a content display in accordance with an embodiment.

FIG. 7 depicts a content display in accordance with an embodiment.

In various embodiments, the content display 602 may comprise as a transparency modulator an array of masking pixels 702. And, for displaying content, the content display 602 may comprise an array of content display pixels 704. The individual pixels of the array of content display pixels 704 may be driven to display a pixel of an image. The individual pixels of the array of masking pixels 702 may be driven to switch between transparent and opaque states depending on control signals. When in a transparent state, a masking pixel may allow light to pass through a region of the masking pixels. When operated in conjunction with the optical source 102 and optical receiver 104, the array of masking pixels 702 and the array of content display pixels 704 may allow content to be displayed simultaneously as ranging. Individual pixels of the masking pixels 702 may be selected to allow light to pass through the content display 602 while the content display pixels 704 are driven are to display an image on the content display 602.

In various embodiments, illumination patterns may be implemented with the masking pixels. For an optical source 102 with a single point, the state of the array of the masking pixels may be driven according to a masking pattern to allow light through the content display 602 in the desired illumination pattern. For example the illumination pattern depicted in FIG. 4 may be implemented by driving masking pixels to a pattern that matches the pattern depicted in FIG. 4. Likewise, the array of masking pixels may be driven to match a sensing pattern to allow light to reach an optical receiver at desired pixels.

In various embodiments, the array of masking may be driven in coordination with the optical source 102 and the optical receiver 104 so that light paths are open when the optical source 102 emits a light pulse. Masking patterns for the array of masking pixels 702 may be determined by an illumination matrix or sensing matrix.

The array of masking pixels 702 may comprise a switchable diffuser plane with a transmissive LCD screen. For example, as described in "A transparent display with per-pixel color and opacity control," in *ACM SIGGRAPH* 2019 *Emerging Technologies, SIGGRAPH* 2019. 2019, T. J. Rhodes, G. Miller, which is incorporated herein by reference. Also see "Going Beyond the Display: A Surface Technology with an Electronically Switchable Diffuser," Izadi et al., Proceedings of the 21st Annual ACM Symposium on User Interface Software and Technology.

In various embodiments, it may be advantageous to control when and where ranging data is collected. By using sparse illumination and sensing patterns, any variation may be dispersed across the content display 602 to dilute any visual impact resulting from the transparency modulation of the masking pixels 702. Ranging samples may also occur less frequently than refresh rate of the array of content display pixels 704. This may also help to reduce any visual distortion of the image provided by the content display pixels 704 as a result of the transparency modulation. For example, various embodiments, the array of masking pixels 702 may be driven to a transparent state one out of ten frames of the content display 602. In other words, a ratio of data collection frames for ranging to image display frames may be one to ten. Depending on the frame rate of the array of content display pixels 704, this may make data collection for ranging virtually undetectable by a viewer. As will be appreciated, the ratio may be different in different embodiments accounting for the capabilities of the system and the application. As will also be appreciated image display frames may be synchronized to occur in phase or out of phase with data collection samples(ranging). In various embodiments, masking may be synchronized with data capture. In various embodiments, In various embodiments, the resolution of the array of content display pixels 704, the array of masking pixels 702, the optical receiver 104, and the optical source 102 may be the same. In various embodiments, the resolution of any or all may be different. The image resolution from ranging may be determined by the pixel density of the array of masking pixels 702

Figure 8:
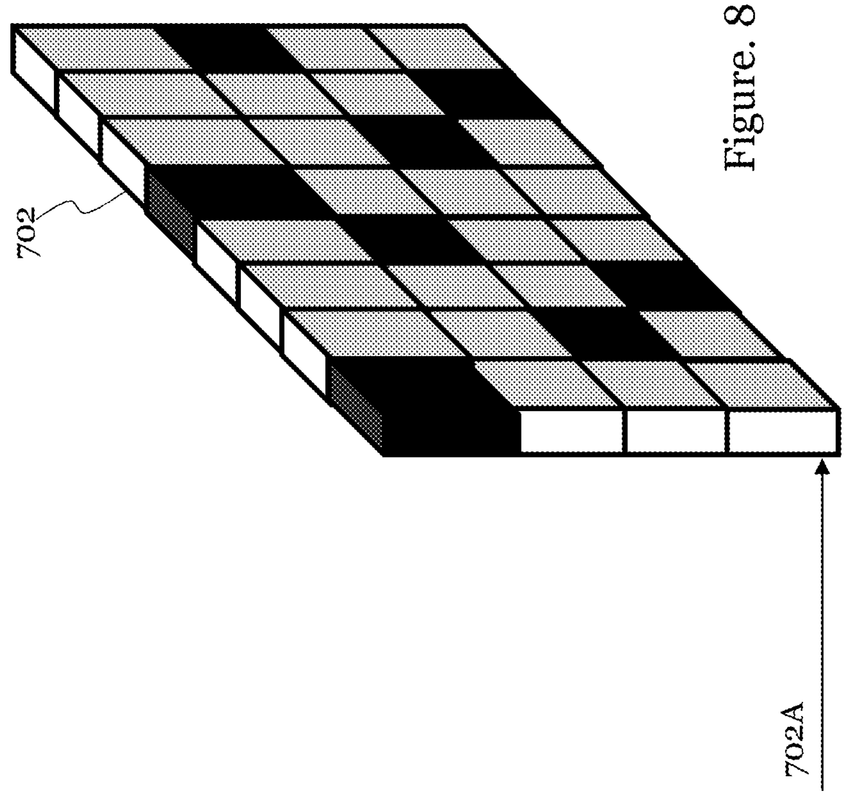
FIG. 8 depicts an array of masking pixels in accordance with an embodiment.

FIG. 8 depicts an array of masking pixels in accordance with an embodiment.

The array of masking pixels 702 may be individually addressable to switch between an opaque state and a transparent state. Masking pixels in a transparent state are represented with black shading. It should be appreciated that array of masking pixels may be driven to any pattern of transparent and opaque states, which may allow projection of an illumination patter and reception of light in accordance with sensing matrix. When a masking pixel of the array of masking pixels 702 is individually driven to the transparent state, light may pass through the pixel. When a masking pixel of the array of masking pixels 702 is individually driven to the opaque state, light may be blocked by the masking pixel.

The masking pixels of the array of masking pixels 702 may be driven to allow light to pass through in a random pattern for light ranging data collection. As will be appreciated data may be with multiple samples. Each sample may correspond to a random pattern. The array of masking pixels 702 may thus perform masking for the optical source 102 and the optical receiver 104. Patterns for samples may be determined by illumination and sensing matrices. The array of masking pixels 702 may receive a driving signal 702A. The drive signal may be received from a graphics processor unit, the processor 126, or other controller. In various embodiments, the array of masking pixels 702 may comprise electrodes for each pixel that are driven in conjunction with the driving signal to vary the pixels of the array of masking pixels 702 between pixels.

Figure 9:
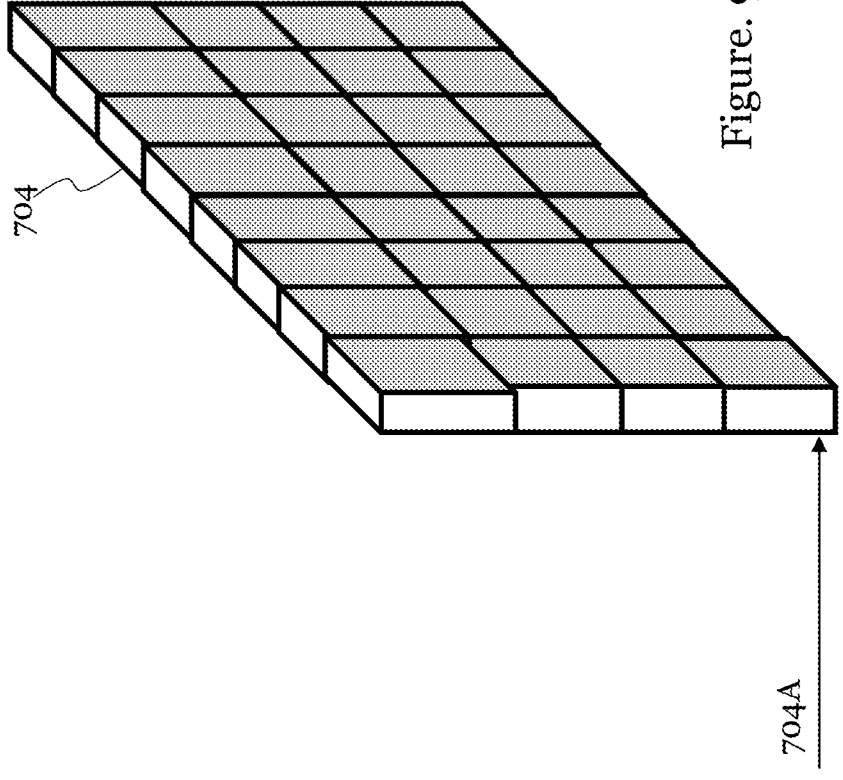
FIG. 9 depicts an array of content display pixels in accordance with an embodiment.

FIG. 9 depicts an array of content display pixels in accordance with an embodiment.

The array of content display pixels 704 may comprise a transparent OLED array, in various embodiments. Each individual pixel of the array of content display pixels 704 may be driven in accordance with a drive signal 704A to produce an image. The image may be refreshed depending on the refresh rate of the array of content display pixels 704. Videos and other image content may be displayed by the array of content display pixels 704. The drive signal 704A may be produced by a Graphics Processing Unit or other controller. In various embodiments, as will be appreciate by one of ordinary skill in the art, each pixel may comprise R, G, and B elements that that may be varied in intensity to provide a wide spectrum of colors. Electrodes for each pixel, (or each RGB element) may be provided for individual addressability.

It should be appreciated that displays other than OLED displays may be utilized for the content display. An OLED represents but one possibility. In various embodiments, other transparent content displays device with light modulation capabilities or transparency properties which change with display state may be utilized. For example, an LCD (which is inherently transparent coupled with a backlight) or other content displays.

Figure 10:
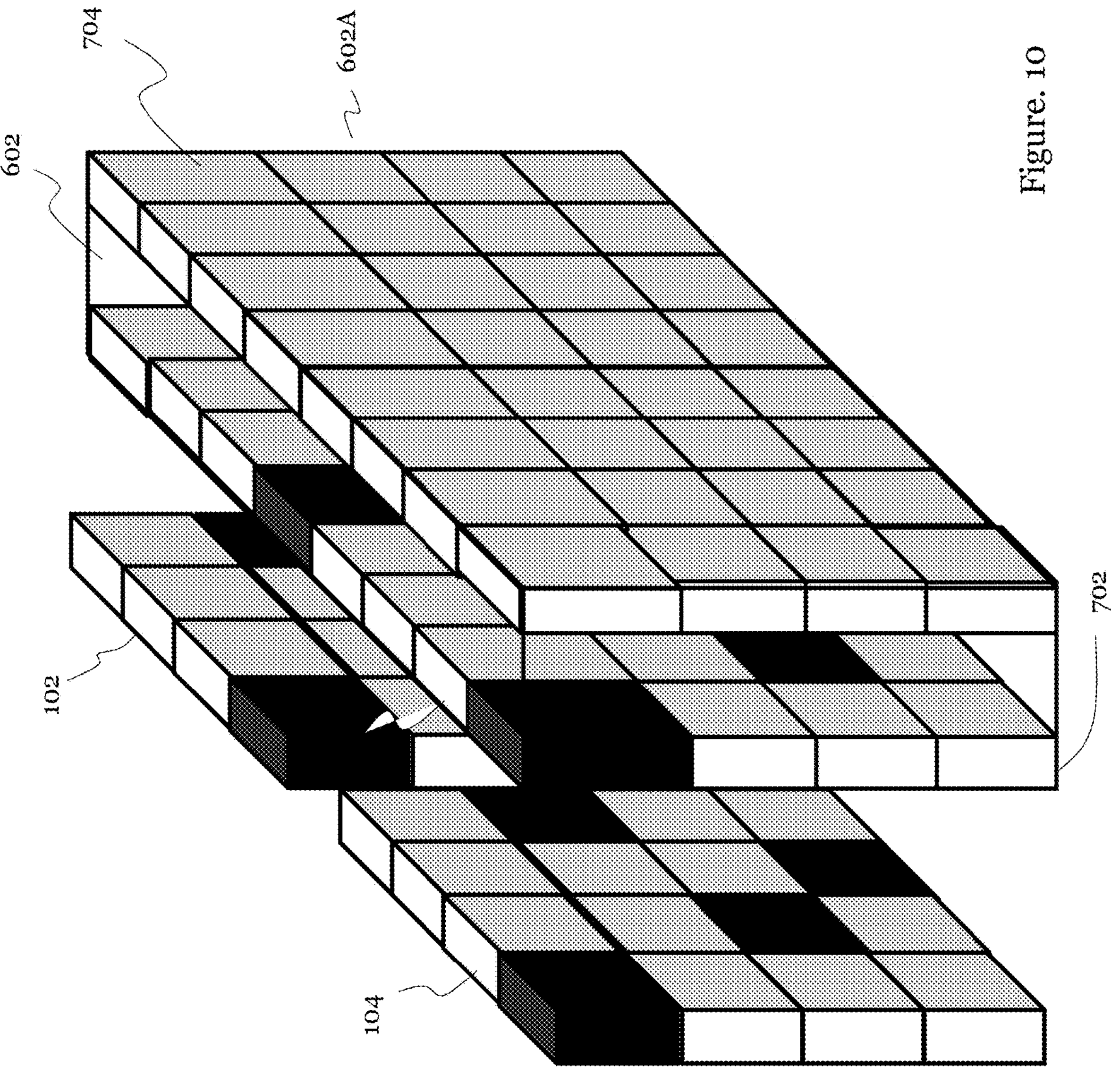
FIG. 10 depicts alignment of an optical source with the content display in accordance with an embodiment.

FIG. 10 depicts alignment of an optical source with the content display in accordance with an embodiment The array of masking pixels 702 may be aligned with the array of light-sensitive pixels so light sensitive pixels may be selected to receive light passing through the content display 602 by driving the masking pixels. In various embodiments, each pixel of the array of light-sensitive pixels of an optical receiver 104 may be aligned with a pixel of the array of masking pixels 702 so that the content display pixels 704 may be individually addressed to allow light to pass through the content display to a chosen pixel of the optical receiver 104. For illustration, in transparent pixels of the array of masking pixels 702 are shaded black (where visible in FIG. 10) and corresponding pixels of the optical receiver 104 are also shaded black. It should also be appreciated that pixels of the array of light-sensitive pixels of an optical receiver 104 may be aligned with a group of masking pixels of the array of masking pixels 702 rather than a single pixel. This may be advantageous depending on the ratio of the resolution of the array of light-sensitive pixels of an optical receiver 104 with the array of masking pixels 702. Pixels of the optical receiver 104 may also be aligned with the content-display pixels. Information about the state of the content display pixels aligned with a light sensitive pixel may be used for reconstruction of an image as will be discussed later in this disclosure.

Similarly, the content display 602 may aligned with the optical source 102. Pixels of the optical source 102 may also be aligned with pixels of the array of masking pixels 702. Individual pixels of the optical source 102 may be aligned with individual masking pixels of the array of masking pixels 702 so that light from a pixel of the optical source 102 may selected to pass through the content display 602 by setting the state of the masking pixels. It should also be appreciated that pixels of the light source may be aligned with a group of masking pixels of the array of masking pixels 702. This may be advantageous depending on the ratio of the resolution of the light source with the array of masking pixels 702. And, the array of masking pixels 702 may itself serve to generate illumination patterns when there is a single point light source (or multiple point light source not individually addressable).

In various embodiments the optical source 102 and optical receiver 104 may be aligned with each other for ranging. It should also be appreciate that lens, light guides, and other optics may be utilized to direct light between the content display 602 and the array of light-sensitive pixels of an optical receiver 104, optical source 102, or both.

Figure 11:
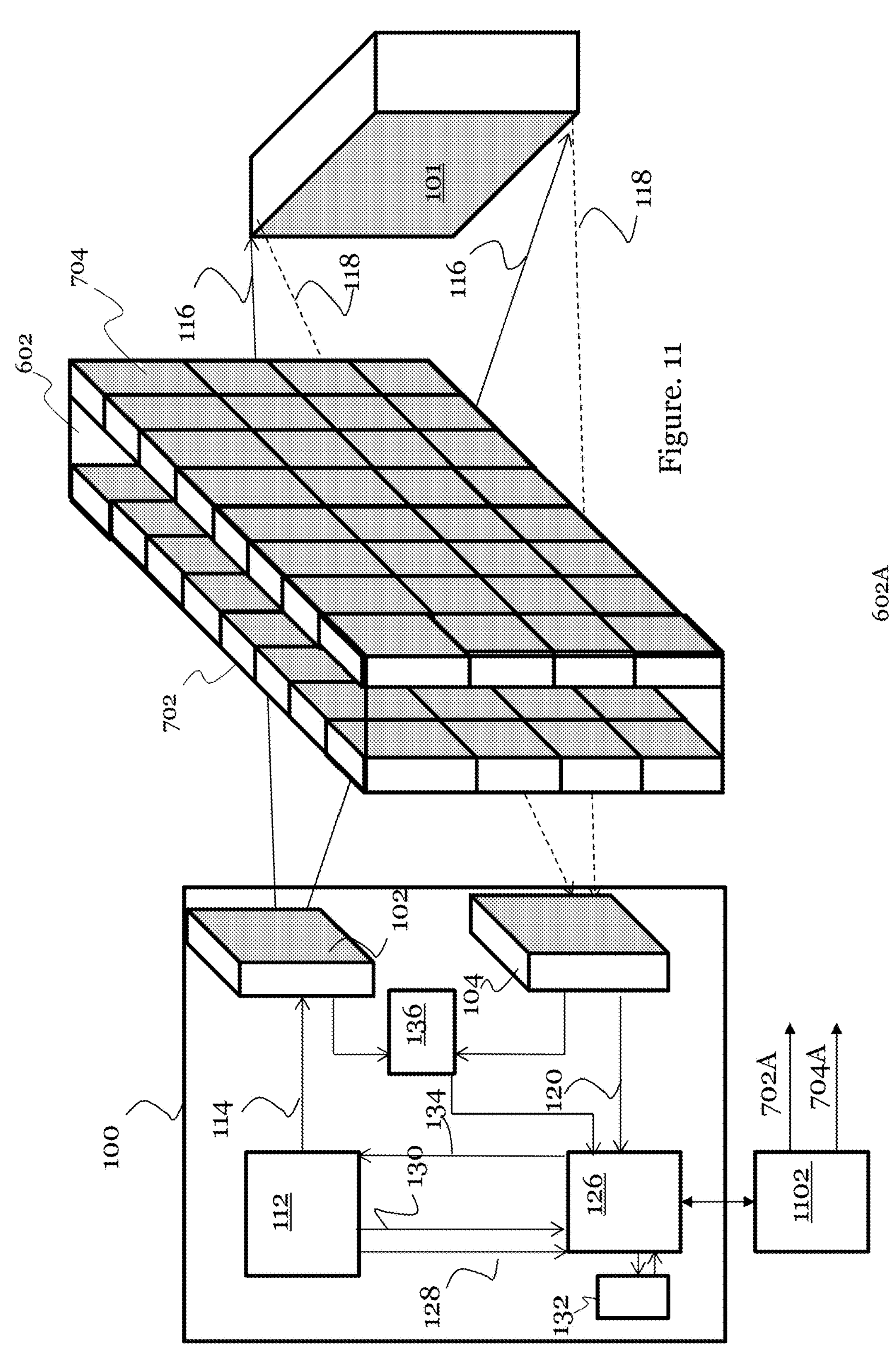
FIG. 11 depicts a light-sampling and content display system in accordance with an embodiment.

FIG. 11 depicts a light-sampling and content display system in accordance with an embodiment.

In various embodiments, the light-sampling and content display system 600 may comprise a light-ranging system 100. Operation of the content display 602 may be coordinated with operation of the light-ranging system 100. For example, the masking pixels of the array of masking pixels 702 may individually addressed in coordination with the light-ranging system 100 to allow ranging. A controller 1102 (such as a GPU) may determine driving signal 702A for the array of masking pixels 702. The controller 1102 may determine drive signal 704A for the array of content display pixels 704. The controller 1102 may be in communication with the processor 126 of the light-ranging system 100. This may allow illumination patterns and sensing patterns for light ranging to be used to drive the masking pixels of the array of masking pixels 702. Random patterns may be pre-stored in a memory 132. Patterns for ranging may also be determined by a pattern generator. In various embodiments, the controller 1102 may be in communication with memory 132 to retrieve illumination and sensing patterns. In various embodiments, the controller 1102 may comprise its own memory to store patterns.

In various embodiments, the optical source 102 may comprise a single light source. The masking pixels of the array of masking pixels 702 may selected to block or pass light aligned with the optical source 102 produced by such an optical source to project patterns into the environment.

As will be appreciated, the size of the light-ranging system 100 relative to the content display 602 may vary in different embodiments. In various embodiments the light-ranging system 100 may comprise a smaller area than the area of the content display pixels 704.

Figure 12:
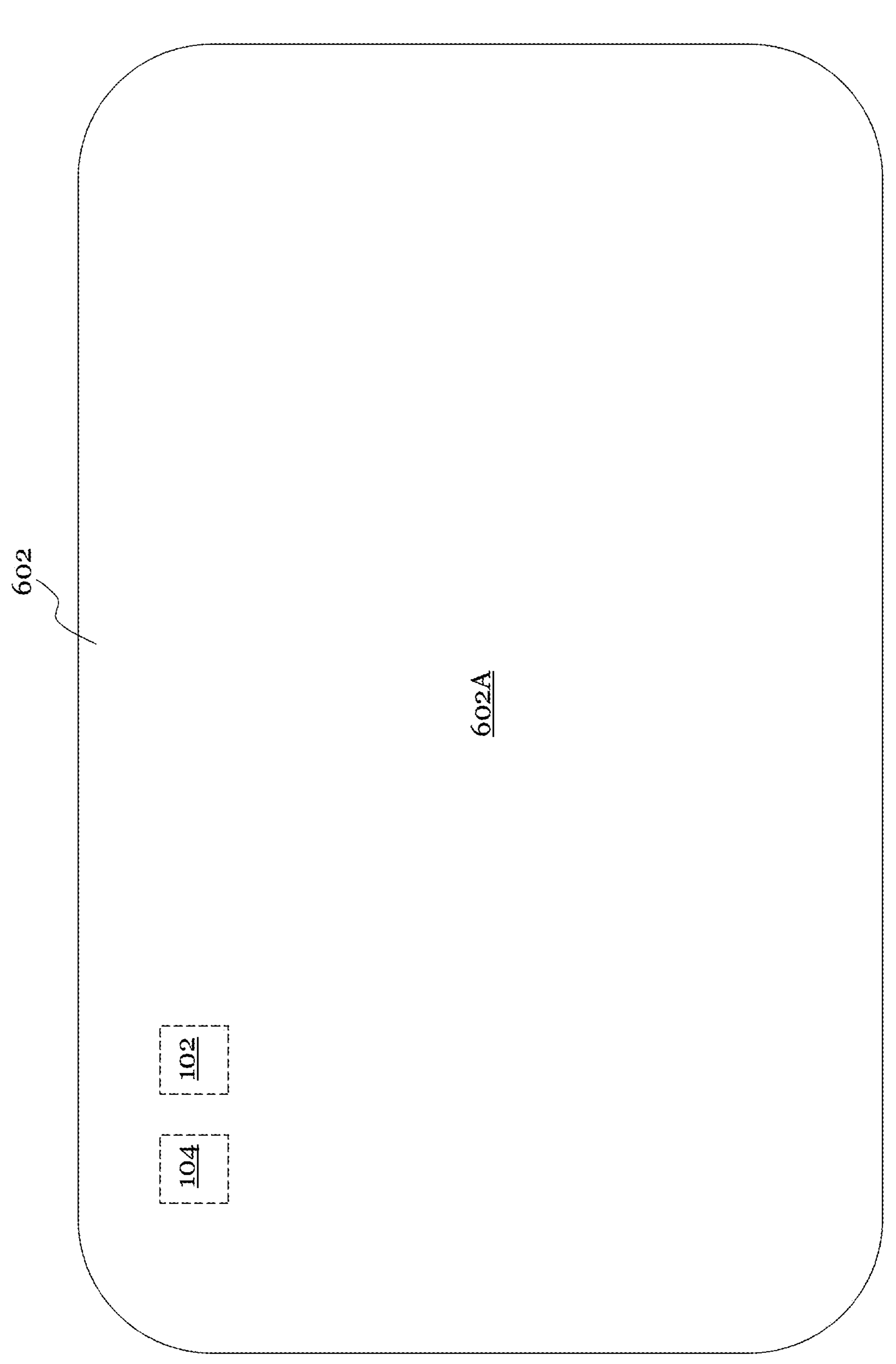
FIG. 12 depicts a light-sampling and content display system from the perspective of the display surface.

FIG. 12 depicts a light-sampling and content display system from the perspective of the display surface.

The view from the display surface 602A represents a view from a viewer of the content display 602. It also illustrates a view from the three-dimensional environment being ranged looking at the content display 602. Dashed lines are used to represent components not visible from this view for illustration. In various embodiments, the surface area of the optical source 102 and optical receiver 104 may be less than the surface area of the content display 602. This may allow a light-ranging system 100 to be hidden behind a content display 602 that is larger. As will be appreciated, the surface area of the array of masking pixels 702 may correspond to the surface area of the optical source 102, optical receiver 104, or both. In other words, in various embodiments, the array of masking pixels 702 may not span all of the content display 602.

In various embodiments, light produced by the content display pixels 704 may be used for augmenting data collection for compressed sensing. All components involved in light modulation may be considered for compressed sensing reconstruction (including light produced by content-display pixels). The principal sensing matrix $A \in \mathbb{R}^{m \times n}$ as discussed with reference to Equation 1 and Equation 2, may be a binary Gaussian random matrix with m rows of length n, n being the vectorized final image resolution. A may have k<n non-zero entries. The non-zero entries may correspond to masking pixels driven to a transparent state to allow light to be sensed by the light-sensitive pixels of an optical receiver 104 passing through the content display 602 (the sensing pattern). In various embodiments, corresponding masking pixels may be driven to the transparent state to allow light from the optical source 102 to be projected into the three-dimensional environment (the illumination pattern). The remaining pixels may be driven to opaque states to block light from the three dimensional environment from reaching the light-sensitive pixels of an optical receiver 104 (or block light from the optical source 102 from reaching passing through the content display 602 to the three-dimensional environment). Pixels driven to opaque state may also modulate light, which may occur if the pixels are neither fully transparent nor fully blocking. The pattern applied to the array of masking pixels 702 for sensing (masking pixels aligned with the array of light-sensitive pixels of an optical receiver 104) may be described as $A_{transmissive}=A$. As will be appreciated, in various embodiments, masking pixels for both the optical source 102 and the light-sensitive pixels of the optical receiver 104 may need to be driven in coordination to allow light emission through the content display 602 and for sensing light reflected back from the three dimensional environment. However, data is only collected from the light sensitive pixels.

In various embodiments, the sensing matrix A may be collected over various samples. This may mean that each sample applies a new pattern that is aggregated. Also multiple samples of the same pattern may be applied. Each sample may correspond to a row of the sensing matrix, A As will be appreciated, light from the content display pixels 704 may also contribute light into (or influence) the environment where the light-sensitive pixels of an optical receiver 104 collect data. This may be due to leakage or from influence on transparency of the masking pixels 702 from the state of a content display pixels. However, the state of the content display pixels of the array of content display pixels 704 is known because they may be driven to that state by controller 1102, and this information can be used to augment the sensing matrix and be utilized for reconstructing an image from ranging data. Data regarding the state of the content display pixels 704 may be communicated to the processor 126 from the controller 1102, in various embodiments.

This additional data may correspond to a matrix $A_{transparent} \in \{0.0, 1.0\}^{m \times n}$. Each value of $A_{transparent}$ may correspond to the state of a content display pixel (or group of pixels) of the content display pixels 704. Each member of $A_{transparent}$ may be assigned a value that depends on the state of corresponding pixel (or group of pixels) of the array of content display.

The locations of data in $A_{transparent}$ may depend on the location of a corresponding light-sensitive pixel in $A_{transmissive}$. For example, a light-sensitive pixel corresponding with position $A_{transmissive(ii)}$ may be aligned with a content-display pixel (or pixels) corresponding to the position $A_{transparent(ii)}$. The values of each position in $A_{transparent}$ may be determined based on the value of a corresponding content display pixel while the light-sensitive pixels of an optical source 104 are counting photons. In various embodiments, a lookup table or conversion factor, or conversion algorithm may be used to convert the state of the content-display pixels in to values for $A_{transparent}$.pixels 704. As will be appreciated, each pixel of the content display may have an R, G, and B state. This may be expressed mathematically by a display matrix $D \in R^{3 \times n}$ Each of these states for a given content-display pixel may be used for determining the corresponding value of $A_{transparent}$ The size $A_{transparent}$ may correspond to the size of $A_{transmissive}$. Further, for photon counting, each light-sensitive pixel of a light-sensitive pixels 104 may be maintained in active state so photons may be counted for each light-sensitive pixel. Data collected from all the pixels may then be used in the vector y.

An augmented sensing matrix $A_{TT}$ in term of $A_{transparent}$ and $A_{transmissive}$ may be described by equation 3 (where the operator "*" is elementwise multiplication and the sensing matrix A is equal $A_{transmissive}$).

$$A_{TT}=A_{transmissive}+(A_{transmissive}-1)*A_{transparent} \quad \text{Equation 3}$$

$A_{TT}$ can then be substituted for A in the minimization problem for compressed sensing reconstruction as shown in Equation 4.

$$\min_x g(\theta x) \quad \text{s.t. } y=(A_{TT})x \quad \text{Equation 4}$$

In various embodiments, the array of content display pixels 704 may comprise transparency channels, such as RGB∝ (wher ∝ is the transparency channel). An augmented array may be described by Equation 5, where A addresses the a channel (rather than a masking pixel of a separate layer) while $A_{transmissive}$ captures the influence of the RGB content on the transparency of the corresponding channel.

$$A_T=A+A_{transmissive} \quad \text{Equation 5}$$

And, the reconstruction minimization for compressed sensing may be expressed by Equation 6.

$$\min_x g(\theta x) \quad \text{s.t. } y=(A_T)x \quad \text{Equation 6}$$

As referenced above, the values of the $A_{transparent}$ may depend on light-emission state of corresponding content-display pixel. In various embodiments, a transparency characterization may be utilized to determine the values for $A_{transparent}$. A representative set of color-transparency pairs may be determined for a particular display device. For example, a given RGB value for a pixel may be corresponded to a transparency value for that pixel. The transparency value may quantify the influence of color of the content-display pixel on the transparency of a corresponding masking pixel. Thus, $A_{transparent}$ may be populated based on the state of the content-display pixels. The influence of a given RGB combination on the transparency of a corresponding masking pixel may be determined based on testing and of the system.

In various embodiments, transparency pairs may be determined for n colors (i.e. combinations of RGB values), where n is less than the total number of combinations possible. Once n color-transparency pairs have been determined, values can be interpolated from this subset to determine the transparency value of a pixel with respect to any RGB value.

In various embodiments, a representative set of color-transparency conversion factors for a specific display device may be determined by characterization and measurements. An interpolation function may be determined based on the representative set of colors for any RGB color from subset to transparency value. The interpolation may be applied using a lookup table or processing to derive transparency value of each pixel depending on the states of the content-display pixels.

For example, let T be transparency, let C be a function of R,G,B translating a RGB pixel value to transparency, then T(R, G, B)=C(R, G, B), where C is a look-up table or interpolation function based on a look-up table with characterization data of the respective transparency properties of a display device with respect to a color (R,G,B) state of pixels. As will be appreciated this is but one example to determine transparency values. In various embodiments, transparency values may be determined based on the states of more than one pixel. The influence of a pixel.

In various embodiments, the principal sensing matrix may be sparse for simplicity, but the full sensing matrix ($A_{TT}$ or $A_T$) may be non-sparse. The principal sensing matrix and full sensing matrix may be non-uniform and incoherent to the sparse basis in the compressive reconstruction. This may be a sparse pattern random binary pattern, but may also be e.g. a Gaussian random pattern which is non-sparse but random and incoherent to the linear basis transform.

As will be appreciated, there are various means to communicate the display state of the content display. In various embodiments the driver for the content display may be communication with a processor. But the content of the content display may be accessible from a display driver, a display controller, the CPU, a GPU to name some examples. In some cases, the content display may be driven by a GPU, but other components may be utilized. As will be appreciated content display may be driven by other components than a GPU. In various embodiments, a GPU might send instructions which are further modified by a display driver, which ultimately toggles the display state with display specific instructions. And, the state of the content display may then be communicated for building $A_{transparent}$.

The location of an optical source 102 relative to the array of light-sensitive pixels of an optical receiver 104 may vary in various embodiments. As will be appreciated, in various embodiments, the optical source 102 and the array of light-sensitive pixels of an optical receiver 104 may comprise independent optical components for directing light to or from the content display 602.

Figure 13:
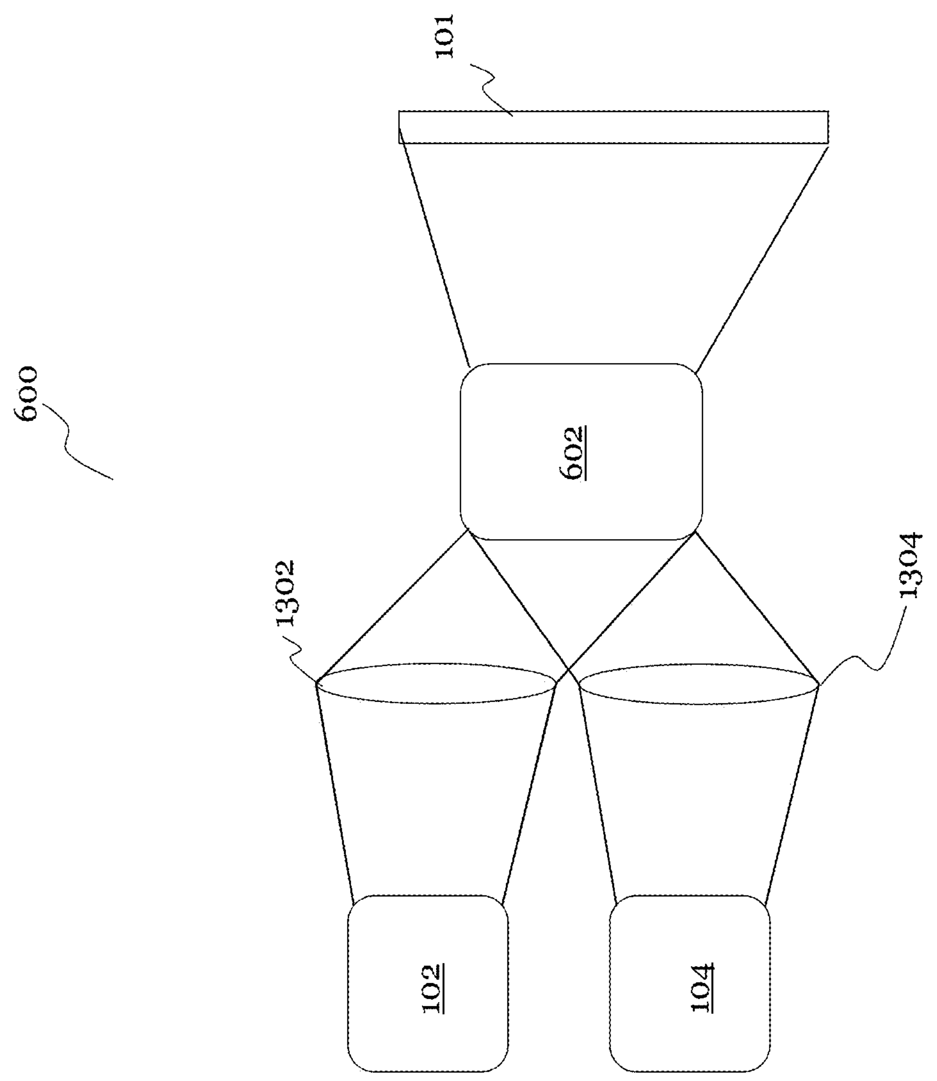
FIG. 13 depicts an embodiment of a light-sampling and content display system in accordance with an embodiment.

FIG. 13 depicts an embodiment of a light-sampling and content display system in accordance with an embodiment;

The light-sampling and content display system 600 may include a lens 1302 (or lens arrangement) for the optical source 102 and a lens or lens 1304 (or lens arrangement) for the optical receiver 104.

Figure 14:
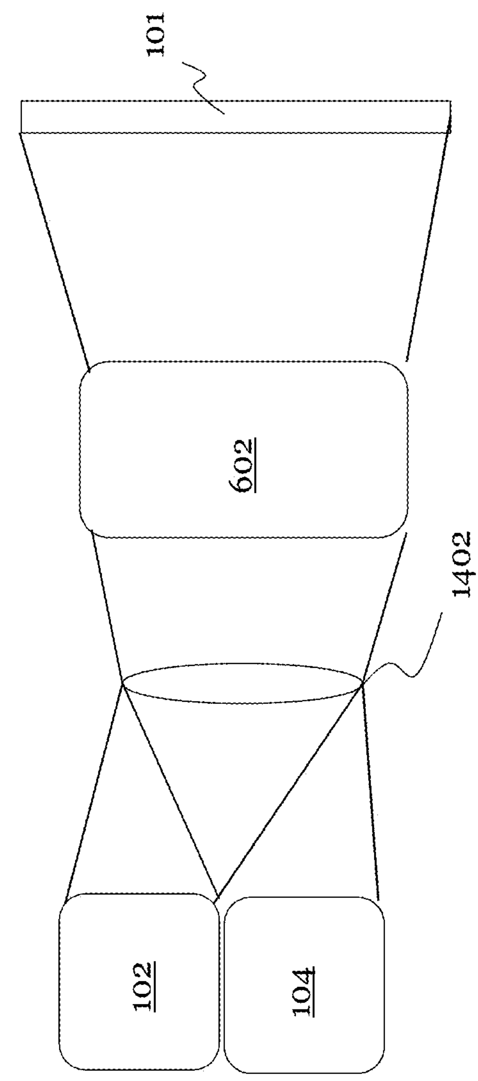
FIG. 14 depicts an embodiment of a light-sampling and content display system in accordance with an embodiment.
Figure 14:

FIG. 14 depicts an embodiment of a light-sampling and content display system in accordance with an embodiment;

In various embodiments, the optical source 102 and optical receiver 104 may be positioned to share optics. The light-sampling and content display system 600 may include a lens 1402 (or lens arrangement) for both the optical source 102 and the optical receiver 104.

Figure 15:
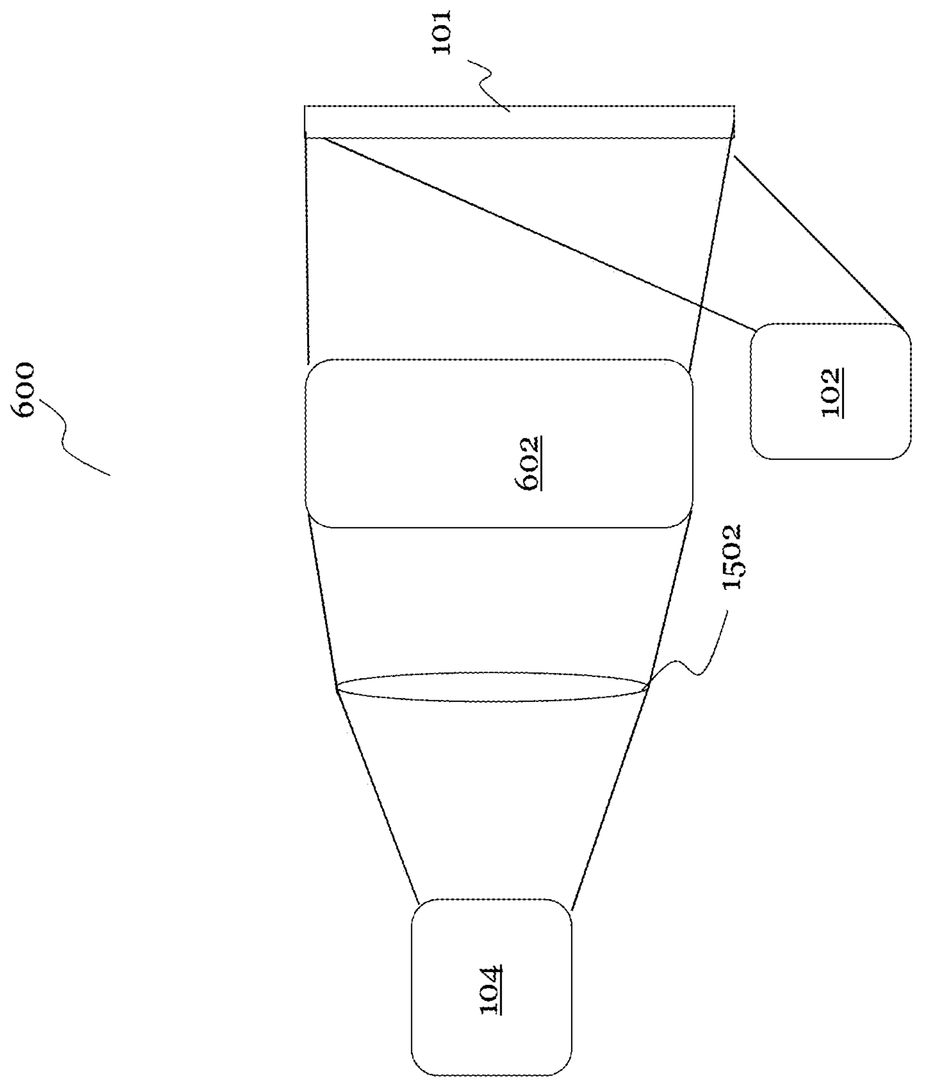
FIG. 15 depicts an embodiment of a light-sampling and content display system in accordance with an embodiment.

FIG. 15 depicts an embodiment of a light-sampling and content display system in accordance with an embodiment.

In various embodiments, the optical source 102 may be located outside the content display 602. The optical receiver 104 may still be located behind the content display 602. As will be appreciated, this may allow the size of the array of masking pixels 702 to be reduced. The light-sampling and content display system 600 may comprise a lens 1502 (lens arrangement) for guiding light passing through the content display 602 to the array of light-sensitive pixels of an optical receiver 104.

As will be appreciated, a light-sampling and content display system 600 may be used in a variety of applications. As discussed previously, in some applications, a light-sampling and content display system 600 may be utilized on a vehicle.

Figure 16:
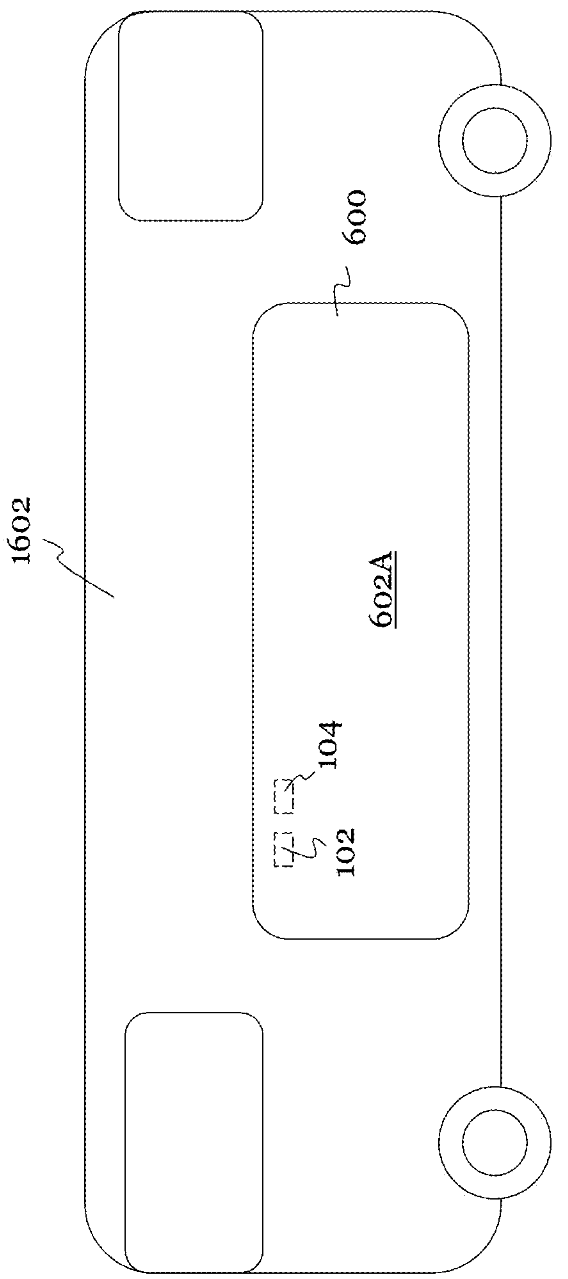
FIG. 16 illustrates an embodiment of a vehicle comprising a light-sampling and content display system in accordance with an embodiment.

FIG. 16 illustrates an embodiment of a vehicle comprising a light-sampling and content display system in accordance with an embodiment.

As will be appreciated, a light-sampling and content display system 600 may be used on the exterior of a vehicle. In many cases, a light-sampling and content display system 600 may be disposed at the front or rear of the vehicle. In FIG. 16, the light-sampling and content display system 600 is located on a side of a vehicle 1602. But, a light-sampling and content display system 600 may be located anywhere on a vehicle. A light-sampling and content display system 600 may also be used for any type of vehicle. It may be particularly advantageous for a self-driving vehicle with where it is advantageous to display content to pedestrians or other roadway users. It also may be advantageous to locate light-sampling and content display system 600 inside a vehicle. Light ranging systems may be utilized for in-cabin monitoring (such as driver awareness) and a light-sampling and content display system 600 may be advantageously located on a display on the interior of a vehicle.

Figure 17:
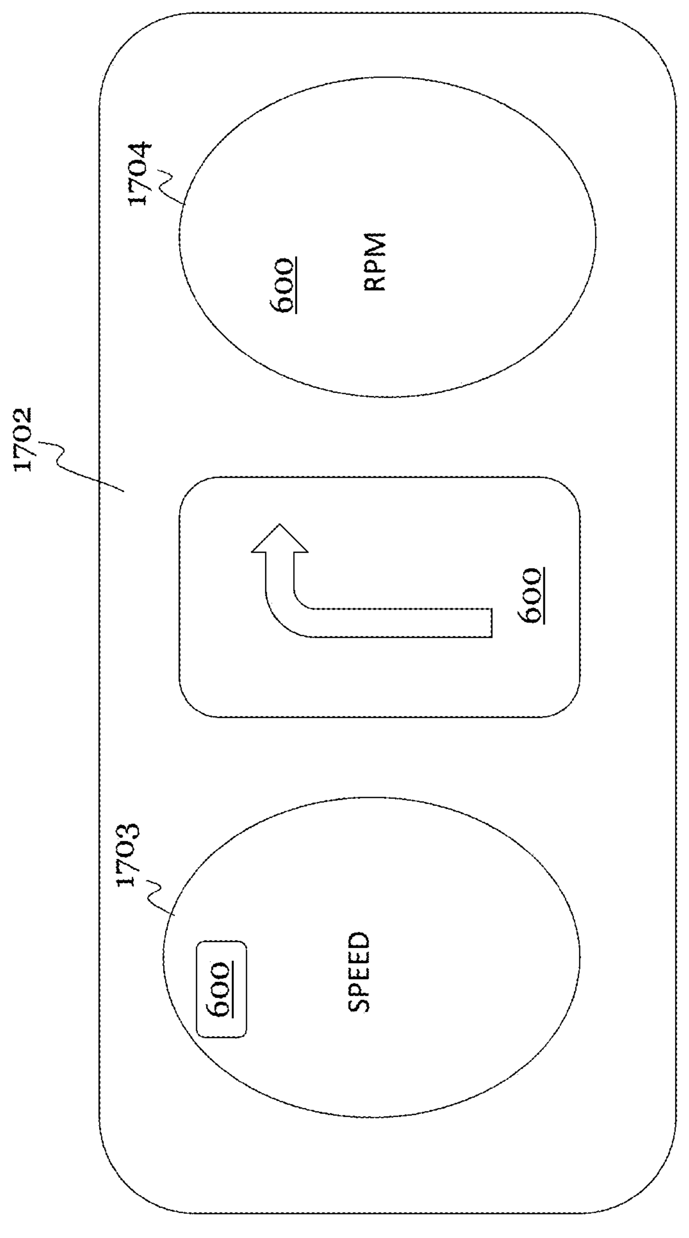
FIG. 17 depicts a light-sampling and content display system in cabin in accordance with an embodiment.

FIG. 17 depicts a light-sampling and content display system in cabin in accordance with an embodiment.

Modern vehicles utilize a variety of interior display screens. Content displays may be used for speedometers, tachometers, infotainment, heads up displays and more. A light-sampling and content display system 600 may be used with any such display. For example a display 1702 may comprise multiple a light-sampling and content display systems 600. A light-sampling and content display systems 600 may be located in the region of a speedometer display 1703. A light-sampling and content display systems 600 may be located in the region of a tachometer display 1704. By locating a ranging system behind a content display no screen area is sacrificed. This also proves beneficial for smart phones, tablets, and other devices with limited screen area.

Figure 18:
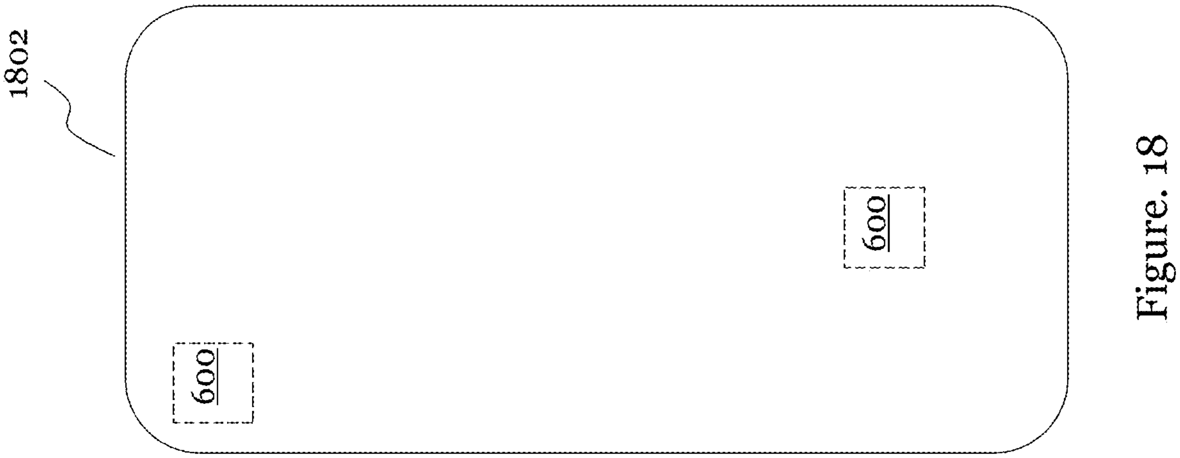
FIG. 18 depicts a light-sampling and content display system in accordance on a phone with an embodiment.

FIG. 18 depicts a light-sampling and content display system in accordance on a phone with an embodiment For example, a smartphone 1802 display surface may utilize multiple a light-sampling and content display systems 600. Screen space is an important concern for smart phones which frequency display content on limited screens. Different light-sampling and content display systems may be used for different functions. Applications include, but are not limited to, depth detection for autofocusing, facial recognition, biometrics, fingerprint biometrics, user presence. The location of a light-sampling and content display system on a content display surface may depend on its function. For example, finger printing systems may be located at a top or bottom position of a smart phone content display surface while a facial recognition ranging system may be preferred at a central location. But, as will be appreciated, a light-sampling and content display systems may located anywhere on a content display in various embodiments. The foregoing examples are provided for illustration and should not be construed to limit the application of the present this disclosure. Further applications for a light-sampling and content display systems include, but are not limited to, laptops, autofocus for Augmented Reality glasses, Simultaneous localization and mapping, scene classification and many others.

Figure 19:
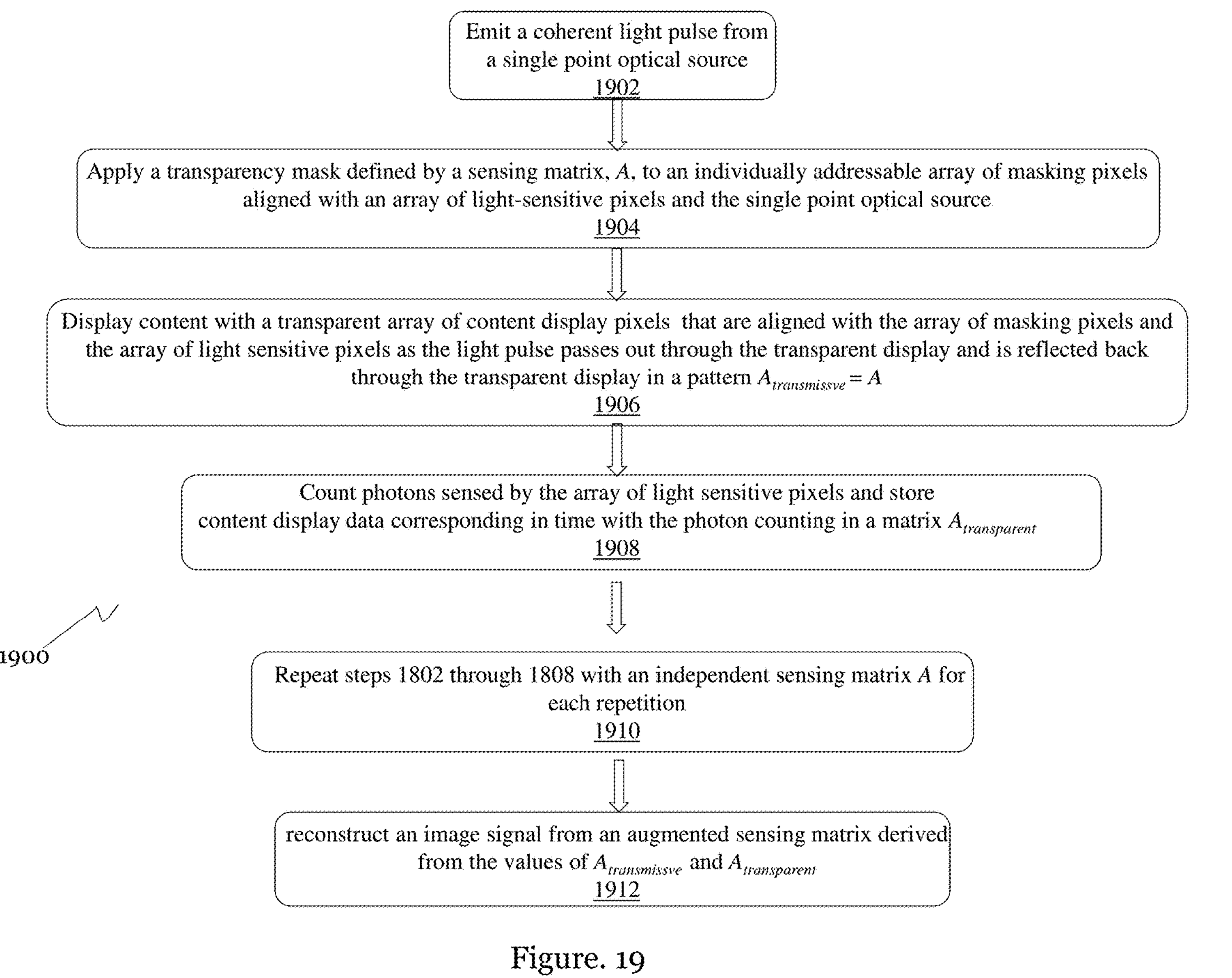
FIG. 19 depicts a method for ranging in accordance with an embodiment of the present invention.

FIG. 19 depicts a method for ranging in accordance with an embodiment of the present invention.

In various embodiments the method 1900 may comprise, at a step 1902, emitting a coherent light pulse from a single point optical source. At a step 1904, the method may comprise applying a transparency mask defined by a sensing matrix, A, to an individually addressable array of masking pixels aligned with an array of light-sensitive pixels of an optical receiver 104 and the single point optical source. At a step 1906, the method may comprise displaying content with a transparent array of content display pixels 704 aligned with the array of masking pixels and the array of light sensitive pixels as the light pulse passes out through the transparent display and is reflected back through the transparent display in a pattern $A_{transmissive}$=A. The method 1900 may comprise at a step 1908, counting photons sensed by the array of light sensitive pixels and storing content display data corresponding in time with the photon counting in a matrix $A_{transparent}$. At a step 1910, the method may comprise repeating steps 1902 through 1908 with an independent sensing matrix A for each repetition. And, at a step 1910 reconstruct image signal from an augmented sensing matrix derived from the values A of $A_{transmissive}$ and $A_{transparent}$.

Figure 20:
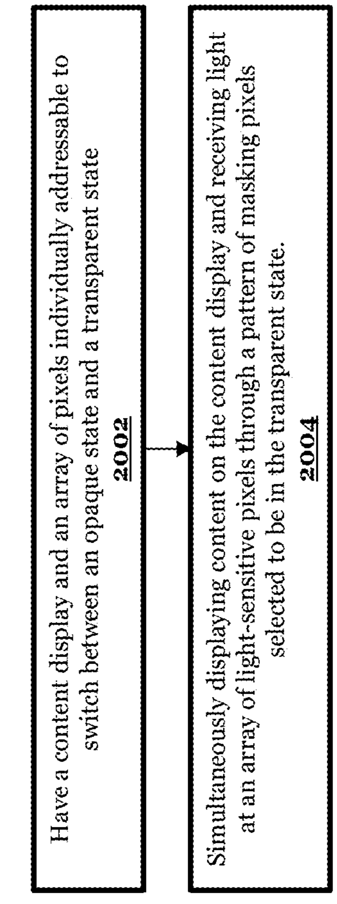
FIG. 20 depicts a method in accordance with an embodiment.

FIG. 20 depicts a method in accordance with an embodiment.

A method 20 to sense light may include at a step 2002 having a content display and an array of pixels individually addressable to switch between an opaque state and a transparent state; and at a step 2004, simultaneously displaying content on the content display and receiving light at an array of light-sensitive pixels through a pattern of masking pixels selected to be in the transparent state.

In various embodiments, the method 20, may further comprise wherein the pattern of masking pixels is sparse.

In various embodiments, the method 20, may further comprise projecting a light pulse into a three-dimensional environment and collecting time of flight data from the array of light-sensitive pixels for light reflected from the three-dimensional environment through the content display.

In various embodiments, the method 20, may further comprise deriving a three-dimensional image from the time of flight data.

In various embodiments, the method 20, may further comprise, wherein deriving the three-dimensional image from the time of flight data comprises utilizing compressed sensing.

In various embodiments, the method 20, may further comprise, wherein the time of flight data used to derive the three-dimensional image is augmented with data from the content display.

In various embodiments, the method 20, may further comprise repeatedly varying the pattern of masking pixels selected to be in the transparent state to sample a three dimensional environment.

Example 1. A system to sample light including an array of light-sensitive pixels; and a content display including: an array of content-display pixels; and an array of masking pixels individually selectable to switch between an opaque state and a transparent state, the array of masking pixels being aligned with the array of light-sensitive pixels so light-sensitive pixels may be selected to receive light passing through the content display by selecting the states of the array of masking pixels.

Example 2. The system of Example 2, further including, wherein the array of content-display pixels comprises a transparent Organic Light Emitting Diode Array.

Example 3. The system of Example 1 or Example 2, further including, a light source aligned with the array of masking pixels so light may be projected through the content display from the light source in illumination patterns that are determined by selecting the states of the array of masking pixels.

Example 4. The system of Example 1 through Example 3 further including, wherein the array of light-sensitive pixels is aligned with the array of masking pixels to receive light passing through the content display from a three-dimensional environment and the light source is aligned with the array of masking pixels to project light through the content display into the three-dimensional environment.

Example 5. The system of Example 1 through Example 4 further including, a non-transitory computer readable memory and a processor in communication with the array of light-sensitive pixels, the non-transitory computer readable memory storing an instruction set that when executed causes the processor to derive a three-dimensional image from data collected from the array of light-sensitive pixels.

Example 6. The system of Example 1 through Example 5 further including, wherein data collected from the array of light-sensitive pixels includes data from light-sensitive pixels aligned with masking pixels in the opaque state.

Example 7. The system of Example 1 through Example 6 further including, a controller that provides a drive signal to select the states of the array of masking pixels.

Example 8. The system of Example 1 through Example 8 further including, wherein the controller includes a graphics processing unit.

Example 9. A method to sense light including having a content display and an array of pixels individually addressable to switch between an opaque state and a transparent state; and simultaneously displaying content on the content display and receiving light at an array of light-sensitive pixels through a pattern of masking pixels selected to be in the transparent state.

Example 10. The method of Example 9, wherein the pattern of masking pixels is sparse.

Example 11. The method of Example 9 or Example 10 further including, projecting a light pulse into a three-dimensional environment and collecting time of flight data from the array of light-sensitive pixels for light reflected from the three-dimensional environment through the content display.

Example 12. The method of Example 9 through Example 11 further including, deriving a three-dimensional image from the time of flight data.

Example 13. The method of Example 9 through Example 12 further including, wherein deriving the three-dimensional image from the time of flight data includes utilizing compressed sensing.

Example 14. The method of Example 9 through Example 13 further including, wherein the time of flight data used to derive the three-dimensional image is augmented with data from the content display.

Example 15. The method of Example 9 through Example 14 further including, repeatedly varying the pattern of masking pixels selected to be in the transparent state to sample a three dimensional environment.

Example 16. A system to sample light including an array of light-sensitive pixels; a light source; a content display including: an array of content-display pixels; and an array of masking pixels individually selectable to switch between an opaque state and a transparent state, the array of masking pixels being aligned with the array of light-sensitive pixels so light-sensitive pixels may be selected to receive light passing through the content display by selecting the states of the array of masking pixels, and the array of masking pixels being aligned with the masking pixels so light may be may be projected through the content display from the light source in illumination patterns that are determined by selecting the states of the array of masking pixels; and a controller coupled with the array of masking pixels to provide a drive signal to select the states of the array of masking pixels.

Example 17. The system of Example 16, further including a non-transitory computer readable memory and a processor in communication with the array of light-sensitive pixels, the non-transitory computer readable memory storing an instruction set that when executed causes the processor to derive a three-dimensional image from data collected from the array of light-sensitive pixels.

Example 18. The system of Example 17 or Example 17, wherein data collected from the array of light-sensitive pixels includes data from light-sensitive pixels aligned with masking pixels in the opaque state.

Example 19. The system of Example 17 through Example 18, wherein the array of content-display pixels comprises a transparent Organic Light Emitting Diode Array.

Example 20. The system of Example 17 through Example 19, wherein the controller includes a graphical processing unit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system to sample light comprising:

an array of light-sensitive pixels; and a content display comprising:

an array of content-display pixels; and an array of masking pixels arranged between the array of content-display pixels and the array of light-sensitive pixels, each pixel in the array of masking pixels individually selectable to switch between an opaque state and a transparent state, the array of masking pixels being aligned with the array of light-sensitive pixels so light-sensitive pixels may be selected to receive light passing through the content display by selecting the states of the array of masking pixels.

2. The system of claim 1, wherein the array of content-display pixels comprises a transparent Organic Light Emitting Diode Array.

3. The system of claim 1, further comprising a light source aligned with the array of masking pixels so light may be projected through the content display from the light source in illumination patterns that are determined by selecting the states of the array of masking pixels.

4. The system of claim 3, wherein the array of light-sensitive pixels is aligned with the array of masking pixels to receive light passing through the content display from a three-dimensional environment and the light source is aligned with the array of masking pixels to project light through the content display into the three-dimensional environment.

5. The system of claim 1, further comprising a non-transitory computer readable memory and a processor in communication with the array of light-sensitive pixels, the non-transitory computer readable memory storing an instruction set that when executed causes the processor to derive a three-dimensional image from data collected from the array of light-sensitive pixels.

6. The system of claim 5, wherein data collected from the array of light-sensitive pixels includes data from light-sensitive pixels aligned with masking pixels in the opaque state.

7. The system of claim 1, further comprising a controller that provides a drive signal to select the states of the array of masking pixels.

8. The system of claim 7, wherein the controller comprises a graphics processing unit.

9. A method to sense light comprising:

having an array of content-display pixels and an array of masking pixels arranged between the array of content-display pixels and an array of light-sensitive pixels, each pixel in the array of masking pixels individually addressable to switch between an opaque state and a transparent state, the array of masking pixels being aligned with the array of light-sensitive pixels so light-sensitive pixels may be selected to receive light passing through the array of content-display pixels by selecting the states of the array of masking pixels; and simultaneously displaying content on the array of content-display pixels and receiving light at the array of light-sensitive pixels through a pattern of masking pixels selected to be in the transparent state.

10. The method of claim 9, wherein the pattern of masking pixels is sparse.

11. The method of claim 9 further comprising projecting a light pulse into a three-dimensional environment and collecting time of flight data from the array of light-sensitive pixels for light reflected from the three-dimensional environment through the array of content-display pixels.

12. The method of claim 11, further comprising deriving a three-dimensional image from the time of flight data.

13. The method of claim 12, wherein deriving the three-dimensional image from the time of flight data comprises utilizing compressed sensing.

14. The method of claim 13, wherein the time of flight data used to derive the three-dimensional image is augmented with data from the array of content-display pixels.

15. The method of claim 9, further comprising repeatedly varying the pattern of masking pixels selected to be in the transparent state to sample a three dimensional environment.

16. A system to sample light comprising:

an array of light-sensitive pixels;

a light source;

a content display comprising:

an array of content-display pixels; and an array of masking pixels arranged between the array of content-display pixels and the array of light-sensitive pixels, each pixel in the array of masking pixels individually selectable to switch between an opaque state and a transparent state, the array of masking pixels being aligned with the array of light-sensitive pixels so light-sensitive pixels may be selected to receive light passing through the content display by selecting the states of the array of masking pixels, and the array of masking pixels being aligned with the light source so light may be projected through the content display from the light source in illumination patterns that are determined by selecting the states of the array of masking pixels; and a controller coupled with the array of masking pixels to provide a drive signal to select the states of the array of masking pixels.

17. The system of claim 16, further comprising a non-transitory computer readable memory and a processor in communication with the array of light-sensitive pixels, the non-transitory computer readable memory storing an instruction set that when executed causes the processor to derive a three-dimensional image from data collected from the array of light-sensitive pixels.

18. The system of claim 17, wherein data collected from the array of light-sensitive pixels includes data from light-sensitive pixels aligned with masking pixels in the opaque state.

19. The system of claim 18, wherein the array of content-display pixels comprises a transparent Organic Light Emitting Diode Array.

20. The system of claim 19, wherein the controller comprises a graphics processing unit.

* * * * *